US012136981B2

(12) United States Patent
Jassal et al.

(10) Patent No.: US 12,136,981 B2
(45) Date of Patent: *Nov. 5, 2024

(54) SYSTEMS AND METHODS FOR ANGULAR DIRECTION INDICATION IN WIRELESS COMMUNICATION

(71) Applicants: Aman Jassal, Stittsville (CA); Amine Maaref, Ottawa (CA); Jianglei Ma, Ottawa (CA)

(72) Inventors: Aman Jassal, Stittsville (CA); Amine Maaref, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,781

(22) Filed: May 19, 2022

(65) Prior Publication Data
US 2022/0278733 A1 Sep. 1, 2022

Related U.S. Application Data

(63) Continuation of application No. 16/999,761, filed on Aug. 21, 2020, now Pat. No. 11,349,550.

(51) Int. Cl.
*H04B 7/06* (2006.01)
*H04L 5/00* (2006.01)

(52) U.S. Cl.
CPC ......... *H04B 7/0695* (2013.01); *H04L 5/0005* (2013.01); *H04L 5/0048* (2013.01)

(58) Field of Classification Search
CPC ... H04B 7/0695; H04L 5/0005; H04L 5/0014; H04L 5/0023; H04L 5/0048
See application file for complete search history.

(56) References Cited

U.S. PATENT DOCUMENTS 9,445,389 B1   9/2016  Kullman et al.
11,349,550 B2 * 5/2022  Jassal ..................... H04B 7/086
(Continued)

FOREIGN PATENT DOCUMENTS

CN    109891476 A   6/2019
CN    110958616 A   4/2020
(Continued)

OTHER PUBLICATIONS

S1-191106, Huawei et al, Use case for 3GPP assisted UBS control, 3GPP TSG-SA WG1 Meeting #86, Suzhou, P. R. China, May 6-10, 2019, total 2 pages.
(Continued)

*Primary Examiner* — David B Lugo

(57) ABSTRACT

An integrated terrestrial/non-terrestrial network may allow for enhanced network coverage. However, there are control and management challenges associated with an integrated terrestrial/non-terrestrial network because the network and user equipments (UEs) are no longer confined to only using conventional cellular communication via terrestrial transmit-and-receive points (T-TRPs). One challenge is how to perform beam management. In some embodiments, methods and systems are disclosed in which an indication of angular direction (e.g. beam direction) is provided by the T-TRP. The indication of angular direction may be used by a UE for communicating with a non-terrestrial TRP (NT-TRP), e.g. using beamforming. However, the methods are not limited to integrated terrestrial/non-terrestrial networks or the involvement of NT-TRPs, but apply more generally to indicating angular direction for directional communication.

20 Claims, 15 Drawing Sheets

(56) References Cited

U.S. PATENT DOCUMENTS

| | | |
|---|---|---|
| 2007/0066238 A1 | 3/2007 | Zhang et al. |
| 2011/0086662 A1 | 4/2011 | Fong et al. |
| 2013/0229980 A1 | 9/2013 | Wernersson et al. |
| 2016/0165583 A1 | 6/2016 | Ho et al. |
| 2018/0019516 A1 | 1/2018 | Teague |
| 2019/0044593 A1 | 2/2019 | John Wilson et al. |
| 2019/0082302 A1 | 3/2019 | Swanson et al. |
| 2020/0100327 A1 | 3/2020 | Zhang et al. |
| 2021/0058899 A1 | 2/2021 | Lee et al. |
| 2021/0194571 A1* | 6/2021 | Ma ................ H04B 7/2125 |
| 2021/0251012 A1 | 8/2021 | Shrestha et al. |
| 2021/0360429 A1* | 11/2021 | Reial ................ H04W 8/24 |
| 2022/0060238 A1 | 2/2022 | Jassal et al. |

FOREIGN PATENT DOCUMENTS

| | | |
|---|---|---|
| CN | 111010223 A | 4/2020 |
| JP | 2015185953 A | 10/2015 |
| KR | 20180047596 A | 5/2018 |
| WO | 2019029080 A1 | 2/2019 |

OTHER PUBLICATIONS

S1-191444 (revision of S1-191175, S1-191480), Qualcomm Incorporated, Quality improvement of TR22.829 (FS_EAV), 3GPP TSG-SA WG1 Meeting #86, Suzhou, China, May 6-10, 2019, total 31 pages.

* cited by examiner

| Zenith Angle | -10 | -8 | -6 | -4 | -3 | -2 | -1 | 0 | 1 | 2 | 3 | 4 | 6 | 8 | 10 |
|---|---|---|---|---|---|---|---|---|---|---|---|---|---|---|---|
| Bit Value | 1111 | 1101 | 1110 | 1100 | 1011 | 1010 | 1001 | 0000 | 0001 | 0010 | 0011 | 0100 | 0110 | 0101 | 0111 |

| Azimuth Angle | 0 – 44 degrees | 45 – 89 degrees | 90 – 134 degrees | 135 – 179 degrees | 180 – 224 degrees | 225 – 269 degrees | 270 – 314 degrees | 315 – 359 degrees |
|---|---|---|---|---|---|---|---|---|
| Bit Value | 000 | 001 | 010 | 011 | 100 | 101 | 110 | 111 |

| Zenith Angle | -10 | -8 | -6 | -4 | -3 | -2 | -1 | 0 | 1 | 2 | 3 | 4 | 6 | 8 | 10 |
|---|---|---|---|---|---|---|---|---|---|---|---|---|---|---|---|
| Bit Value | 1111 | 1101 | 1110 | 1100 | 1011 | 1010 | 1001 | 0000 | 0001 | 0010 | 0011 | 0100 | 0110 | 0101 | 0111 |

| Azimuth Angle | 0 – 44 degrees | 45 – 89 degrees | 90 – 134 degrees | 135 – 179 degrees | 180 – 224 degrees | 225 – 269 degrees | 270 – 314 degrees | 315 – 359 degrees |
|---|---|---|---|---|---|---|---|---|
| Bit Value | 000 | 001 | 010 | 011 | 100 | 101 | 110 | 111 |

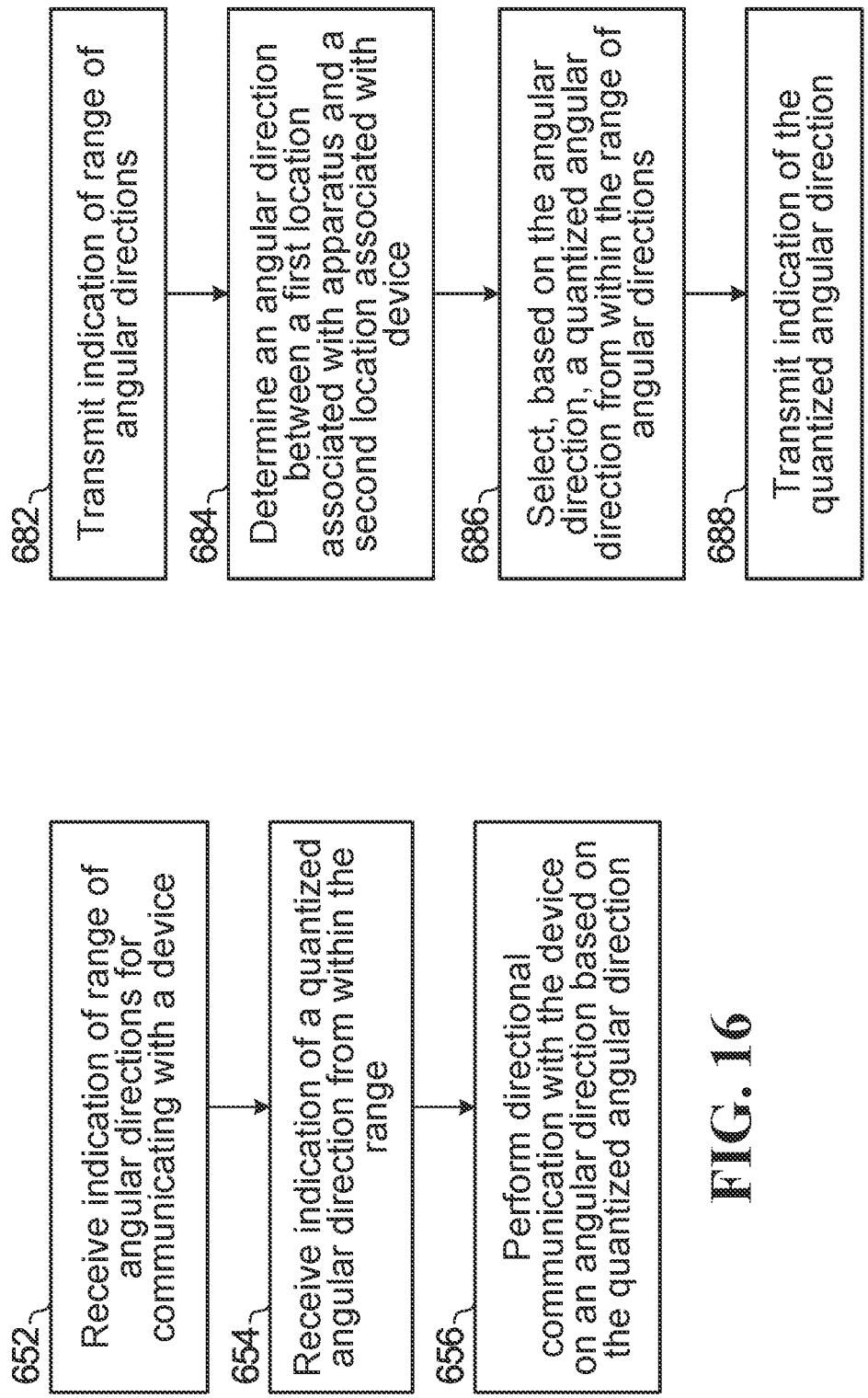

SYSTEMS AND METHODS FOR ANGULAR DIRECTION INDICATION IN WIRELESS COMMUNICATION

PRIORITY

This application is a continuation of U.S. patent application Ser. No. 16/999,761, entitled "Systems and Methods for Angular Direction Indication in Wireless Communication", which was filed on Aug. 21, 2020, and is incorporated herein by reference.

FIELD

The present application relates to directional communication (e.g. beamforming) in a wireless communication system that may include both terrestrial and non-terrestrial transmit-and-receive points.

BACKGROUND

Current wireless communication systems are largely based on terrestrial systems. The user equipments (UEs) may move, but the network's transmit-and-receive points (TRPs) are terrestrial, e.g. typically stationary, mounted on a tower or structure connected to the ground, and not easily moved. This limits flexibility because terrestrial TRPs may be difficult to install in some areas and may be difficult to relocate to areas with high-demand.

A wireless communication system could alternatively or additionally employ non-terrestrial TRPs. A non-terrestrial TRP is a TRP that moves through space to relocate, e.g. on a dynamic or semi-static basis. Examples of non-terrestrial TRPs include TRPs mounted on drones, balloons, planes, and/or satellites.

A wireless communication system that includes both terrestrial and non-terrestrial TRPs will be referred to as an integrated terrestrial/non-terrestrial network. An integrated terrestrial/non-terrestrial network may allow for enhanced network coverage. For example, if there is a temporary high demand on a terrestrial TRP, e.g. because of a large gathering of UEs in one location, then a drone having a non-terrestrial TRP mounted thereon may be able to fly over the gathering, thereby increasing communication capacity by allowing for communication between the UEs and the network via the terrestrial TRP and/or via the non-terrestrial TRP.

However, there are control and management challenges associated with an integrated terrestrial/non-terrestrial network because the network and UEs are no longer confined to only using conventional cellular communication via terrestrial TRPs. Instead, non-terrestrial TRPs may move through space across different cells and temporarily assist with communication between the UEs and the network. Additional control and management considerations are required in order to effectively deploy the non-terrestrial TRPs. In particular, directional communication presents challenges unique to non-terrestrial TRPs, due to their changing positions.

SUMMARY

One technical problem recognized by the inventors is how to perform beam management in integrated terrestrial/non-terrestrial networks. In an integrated terrestrial/non-terrestrial network, directional communication may be implemented by the UE and/or by a non-terrestrial TRP (NT-TRP) and/or by a terrestrial TRP (T-TRP). The directional communication may be implemented using beamforming. Transmit beamforming refers to directing a transmission in a particular direction by performing signal processing to cause the transmitted signal to experience constructive interference in the particular direction. The signal transmitted using transmit beamforming may be referred to a being transmitted on a transmit beam. Receive beamforming refers to performing signal processing on a received signal in a way that causes the received signal to experience constructive interference in a particular direction. The signal received using receive beamforming may be referred to as being received on a receive beam. If two entities are communicating with each other using beamforming, then ideally there is beam correspondence, i.e. the direction of the transmit beam corresponds to the direction of the receive beam. However, beam correspondence is not a necessity, and moreover it might even be the case that one entity implements beamforming and the other entity does not.

A non-terrestrial TRP (NT-TRP) may use beamforming to communicate with a UE and/or with another NT-TRP. A UE may use beamforming to communicate with a NT-TRP. The following problems may occur. How does the UE know the direction in which to perform transmit and/or receive beamforming when communicating with a NT-TRP? How does the NT-TRP know the direction in which to perform transmit and/or receive beamforming when communicating with one or more UEs? If two NT-TRPs are communicating with each other, how do they know the direction to perform transmit and/or receive beamforming? To help address one or more of these problems, beam sweeping methods could possibly be used, similar to how a T-TRP performs beam sweeping in the downlink direction to transmit a synchronization signal block (SSB) in multiple beams. However, beam sweeping has relatively high overhead because it involves multiple beams, each in a different beam direction, rather than just one beam.

More generally, regardless of whether NT-TRPs are present and/or regardless of whether the wireless communication system is an integrated terrestrial/non-terrestrial network, if directional communication is to be used by a first device to communicate with a second device, how can the angular direction for the directional communication be communicated to the first device?

In some embodiments, methods and systems are disclosed in which an indication of angular direction is provided in an absolute way, e.g. in terms of beam angle information (BAI). The BAI may be or include an angular direction, which may be a quantized angular direction selected from a range of angular directions. Overhead associated with beam management may possibly be reduced, e.g. by possibly avoiding beam sweeping in some instances. For example, instead of a UE using beam sweeping across different receive beams to determine which receive beam direction has a suitably strong signal for communicating with a NT-TRP, the UE may use BAI associated with a NT-TRP to implement a receive beam in the direction of the NT-TRP. The BAI may also or instead be used by the UE in order to implement a transmit beam in the direction of the NT-TRP. As another example, instead of a first NT-TRP using beam sweeping to communicate with a second NT-TRP, BAI associated with the second NT-TRP may be used by the first NT-TRP to implement a receive beam and/or a transmit beam in the direction of the second NT-TRP. In some embodiments, a T-TRP may transmit an indication of beam direction, e.g. BAI, to a UE and/or to a NT-TRP. In some embodiments, a T-TRP may transmit, to a UE and/or to another NT-TRP, an indication of the time-frequency location at which to find a reference signal transmitted by a particular NT-TRP.

In some embodiments, the range of angular directions may be in the form of a set of quantized angular directions. The angular range may corresponds to a certain region of space. In some embodiments, the angular range might only carry information in an absolute way about the upper bound and the lower bound of the angular directions to be used by the UE. Individual quantized angular directions within the indicated angular range may be determined by the UE, e.g. by uniformly distributing quantized angular directions in the angular range. As another example, a set of quantized angular directions may be explicitly indicated to the UE with the complete set of quantized angular directions corresponding to individual angular directions in an absolute way. This may represent a more complete representation of the region of space that the UE is indicated about because the lower bound of the angular direction, the upper bound of the angular direction, and the resolution of each angular direction is explicitly provided.

In some embodiments, beams refer to spatial filters. Spatial filters are signal processing techniques applied by devices such as a UE, a T-TRP, or an NT-TRP for the purpose of directional communication, e.g. so that the UE or the T-TRP or NT-TRP can transmit or receive physical layer signals or channels in a certain region of space. In some embodiments, directional communication refers to communication where beamforming is used by devices such as a UE, a T-TRP, or an NT-TRP. In wireless communications, such spatial filtering is used to e.g. focus energy in a certain region of space. One example of spatial filtering in wireless communications is called digital precoding, where different physical layer signals carrying data streams are transmitted using multiple antennas and the different antennas use different digital phase shifts such that when the physical layer signals are transmitted over the air using the multiple antennas, the signal waves add up constructively in a certain region of space, e.g. where the UE is located. Another example of spatial filtering is analog beamforming where different physical layer signals are transmitted using multiple antennas and the different antennas use different analog phase shifts such that when the physical layer signals are transmitted over the air using the multiple antennas, the signal waves add up constructively in a certain region of space, e.g. where the UE is located. Another example of spatial filtering is hybrid beamforming, which uses a combination of both digital and analog beamforming to perform signal processing such that signal waves add up constructively in a certain region of space.

In some embodiments, methods in which the T-TRP indicates an angular direction used for communicating with a NT-TRP may be considered lower overhead compared to implementing beam sweeping that involves the use of multiple beams in different directions.

The methods are not limited to an integrated terrestrial/non-terrestrial network. More generally, the methods may be used by a first device to perform directional communication to communicate with a second device, e.g. using a receive beam and/or transmit beam pointed in the direction of the second device. An indication of the angular direction may be received by the first device, e.g. via an indication of BAI in the form of a quantized angular direction.

In one embodiment, there is provided a method that may include receiving an indication of a range of angular directions for communicating with a device. The method may further include receiving an indication of a quantized angular direction from within the range. The method may further include performing directional communication with the device on an angular direction based on the quantized angular direction. The directional communication may be implemented using beamforming, e.g. a receive and/or transmit beam pointed in the quantized angular direction. In some embodiments, the method is performed by a UE and the device is a NT-TRP. In some embodiments, the indication of the quantized angular direction is received from a T-TRP.

In another embodiment, there is provided method that may include transmitting an indication of a range of angular directions for use by an apparatus to communicate with a device. The method may further include determining an angular direction between a first location associated with the apparatus and a second location associated with the device. The method may further include selecting, based on the angular direction, a quantized angular direction from within the range of angular directions. The method may further include transmitting an indication of the quantized angular direction. In some embodiments, the apparatus is a UE and the device is a NT-TRP.

In some embodiments, the methods described herein can be applied to communications between one or more of: UEs, base-stations, satellites, sensors, vehicles (e.g. cars, motorcycles, trucks, trains), reconfigurable intelligent surfaces (RIS) (also known as intelligent reflective surfaces (IRS), smart reflect-array, reconfigurable meta-surface, holographic MIMO) and infrastructures. An indication of an angular direction can be received from any one of the above for the purpose of directional communication on the indicated quantized angular direction.

Systems for performing the methods are also provided.

BRIEF DESCRIPTION OF THE DRAWINGS

Embodiments will be described, by way of example only, with reference to the accompanying figures wherein:

FIGS. 13 to 17 are flow diagrams illustrating methods according to various embodiments.

DETAILED DESCRIPTION

For illustrative purposes, specific example embodiments will now be explained in greater detail below in conjunction with the figures.

Example Communication Systems and Devices

Figure 1:
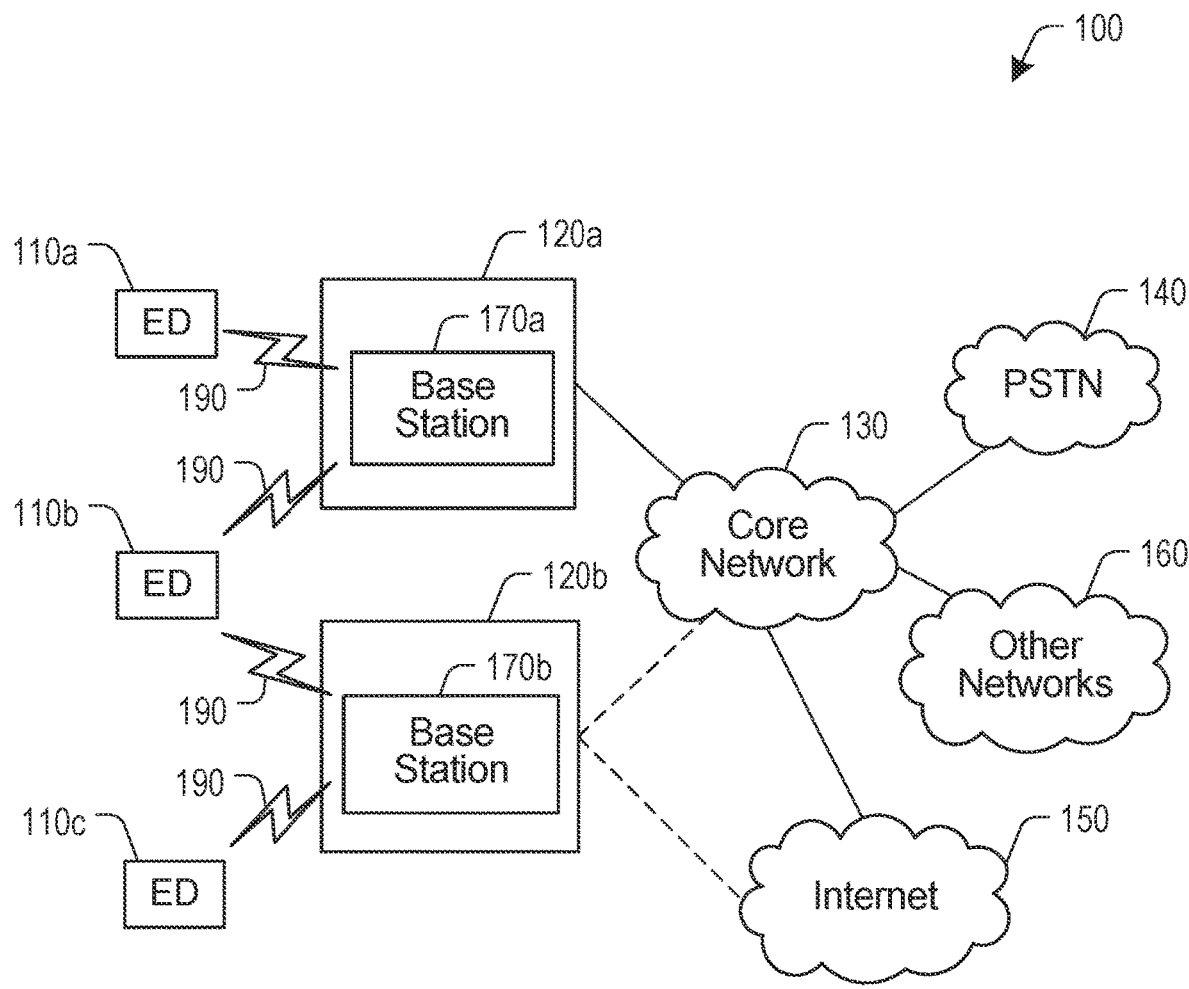
FIG. 1 is a network diagram of an example communication system.

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which might or might not be directly served by core network 130, and might or might not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2:
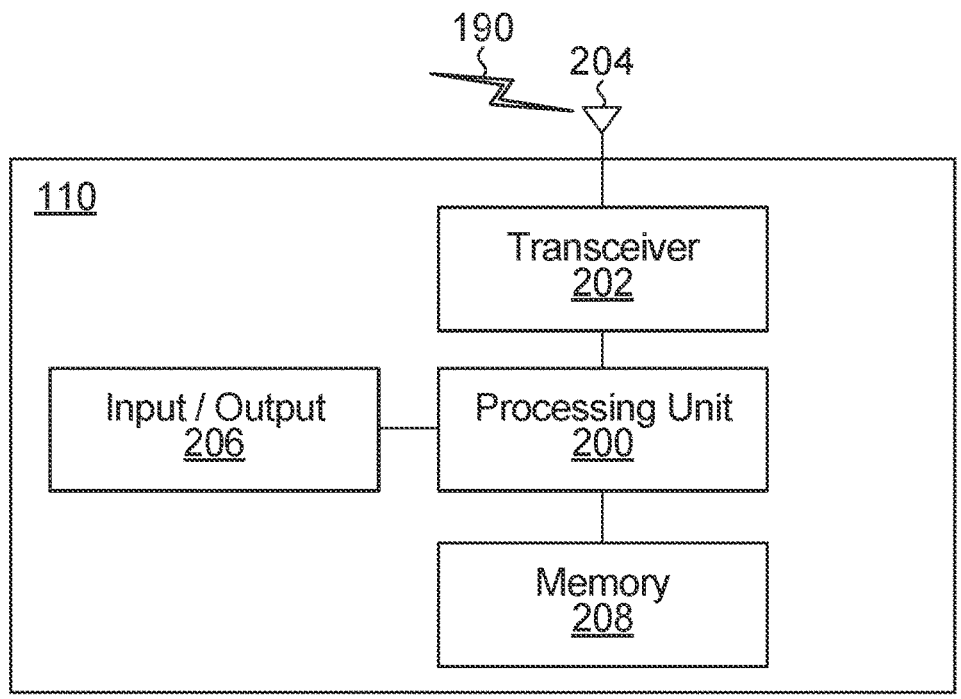
FIG. 2 is a block diagram of an example electronic device.
Figure 3:
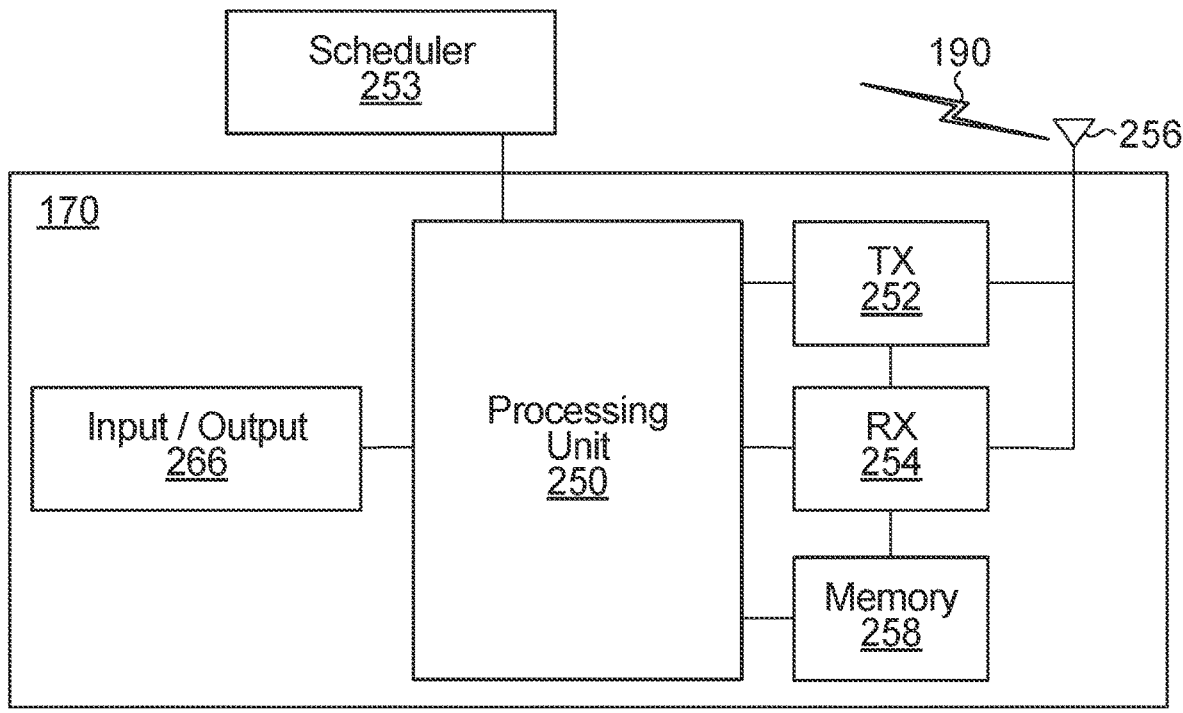
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
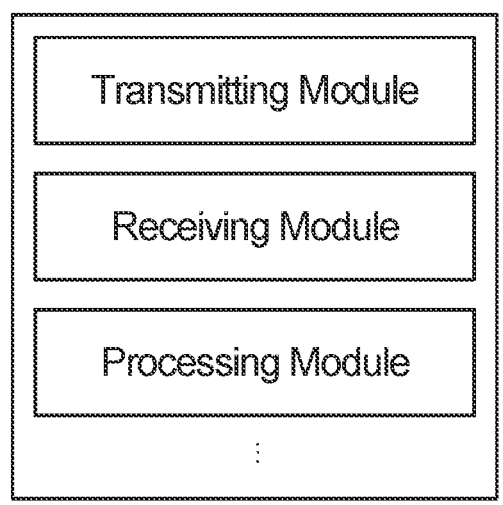
FIG. 4 is a block diagram of example component modules.

One or more steps of the embodiment methods provided herein may be performed by corresponding units or modules, according to FIG. 4. FIG. 4 illustrates units or modules in a device, such as in ED 110 or base station 170. For example, a signal may be transmitted by a transmitting unit or a transmitting module. A signal may be received by a receiving unit or a receiving module. A signal may be processed by a processing unit or a processing module. The processing module may encompass the units/modules described later, in particular the processor 210 or processor 260. Other units/modules may be included in FIG. 4, but are not shown. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Figure 5:
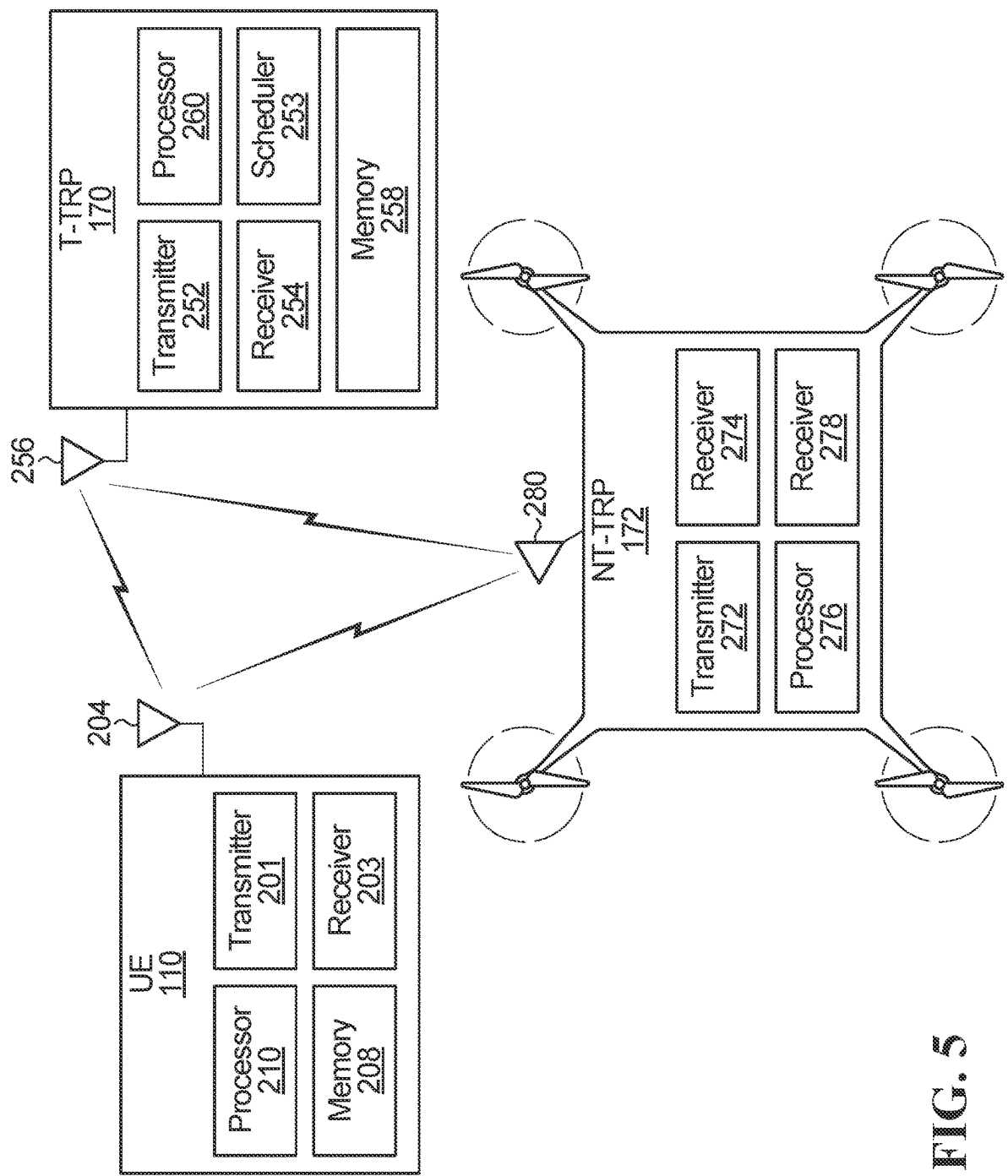
FIG. 5 is a block diagram of an example user equipment, T-TRP, and NT-TRP.

FIG. 5 illustrates another example of an ED 110 and a base station 170. The ED 110 will hereafter be referred to as a user equipment (UE) 110 or apparatus 110. The base station 170 is a T-TRP and will hereafter be referred to as T-TRP 170. Also shown in FIG. 5 is a NT-TRP 172.

The T-TRP 170 may be called other names in some implementations, such as a base station, a base transceiver station, a radio base station, a network node, a network device, a device on the network side, a transmit/receive node, a Node B, an evolved NodeB (eNodeB or eNB), a gigabit NodeB (gNB), a relay station, a remote radio head, a terrestrial node, a terrestrial network device, or a terrestrial base station. In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown). Therefore, in some embodiments, the term T-TRP 170 may also refer to modules on the network side that perform processing operations, such as determining the location of the UE 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the UE 110, e.g. through coordinated multipoint transmissions.

The T-TRP 170 includes a transmitter 252 and a receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the UE 110, processing an uplink transmission received from the UE 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating the symbols for transmission. Processing operations related to processing received transmissions in the uplink or over backhaul may include operations such as receive beamforming, and demodulating and decoding the received symbols. The processor 260 may also perform operations relating to network access (e.g. initial access) and/or downlink synchronization, such as generating the content of the synchronization signal blocks (SSBs) disclosed herein, generating the system information, etc. In some embodiments, the processor 260 also generates the indication of beam direction, e.g. beam angle information (BAI) described herein, which may be scheduled for transmission by scheduler 253. The processor 260 performs other network-side processing operations described herein, such as determining the location of the UE 110, determining where to deploy NT-TRP 172, etc. In some embodiments, the processor 260 may generate signaling, e.g. to configure one or more parameters of the UE 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

The T-TRP 170 further includes a scheduler 253, which may schedule uplink, downlink, and/or backhaul transmissions, including issuing scheduling grants and/or configuring scheduling free ("configured grant") resources. The T-TRP 170 further includes a memory 258 for storing information and data.

Although not illustrated, the processor 260 may form part of the transmitter 252 and/or receiver 254. Also, although not illustrated, the processor 260 may implement the scheduler 253.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a programmed field-programmable gate array (FPGA), a graphical processing unit (GPU), or an application-specific integrated circuit (ASIC).

The NT-TRP 172 is illustrated as a drone, but this is only an example. Also, the NT-TRP 172 may be called other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the UE 110, processing an uplink transmission received from the UE 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating the symbols for transmission. Processing operations related to processing received transmissions in the uplink or over backhaul may include operations such as receive beamforming, and demodulating and decoding the received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the UE 110. Dynamic signaling may be transmitted in a control channel, e.g. a PDCCH, and static or semi-static higher layer signaling may be included in a packet transmitted in a data channel, e.g. in a PDSCH. In some embodiments, the processor 276 generates a reference signal for transmission to UE 110 and/or for transmission to another NT-TRP.

The NT-TRP 172 further includes a memory 278 for storing information and data.

Although not illustrated, the processor 276 may form part of the transmitter 272 and/or receiver 274.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the UE 110, e.g. through coordinated multipoint transmissions.

In the embodiments described below, the NT-TRP 172 implements physical layer processing, but does not implement higher layer functions such as functions at the medium access control (MAC) or radio link control (RLC) layer. This is only an example. More generally, the NT-TRP 172 may implement higher layer functions in addition to physical layer processing.

The UE 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated as a transceiver, e.g. transceiver 202 of FIG. 2. The UE 110 further includes a processor 210 for performing operations including those related to preparing a transmission for uplink transmission to the NT-TRP 172 and/or T-TRP 170, and those related to processing downlink transmissions received from the NT-TRP 172 and/or T-TRP 170. Processing operations related to preparing a transmission for uplink transmission may include operations such as encoding, modulating, transmit beamforming, and generating the symbols for transmission. Processing operations related to processing downlink transmissions may include operations such as receive beamforming, demodulating and decoding the received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172. In some embodiments, the processor 276 implements the transmit beamforming and/or receive beamforming based on the indication of beam direction, e.g. BAI, received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172.

Although not illustrated, the processor 210 may form part of the transmitter 201 and/or receiver 203. The UE 110 further includes a memory 208 for storing information and data.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a FPGA, a GPU, or an ASIC.

The T-TRP 170, the NT-TRP 172, and/or the UE 110 may include other components, but these have been omitted for the sake of clarity.

Deployment of NT-TRPs

In some embodiments a plurality of UEs may, by default, communicate with a network via a T-TRP. However, on an intermittent basis one or more of the UEs may instead or additionally communicate with the network via a NT-TRP. For example a NT-TRP may be deployed and communicate with one or more UEs in particular circumstances, e.g. on an on-demand basis, such as when there is high demand on the T-TRP, and/or when the wireless communication link between the T-TRP and the one or more UEs is weak, and/or when communicating with the UE is high priority, e.g. due to quality of service (QoS) and/or user experience requirements. For example, if there is a temporary large congregation of UEs all served by a same T-TRP, e.g. when a crowd gathers in a small area, then a NT-TRP may be deployed to offload some or all of the traffic demand being placed on the T-TRP.

Figure 6:
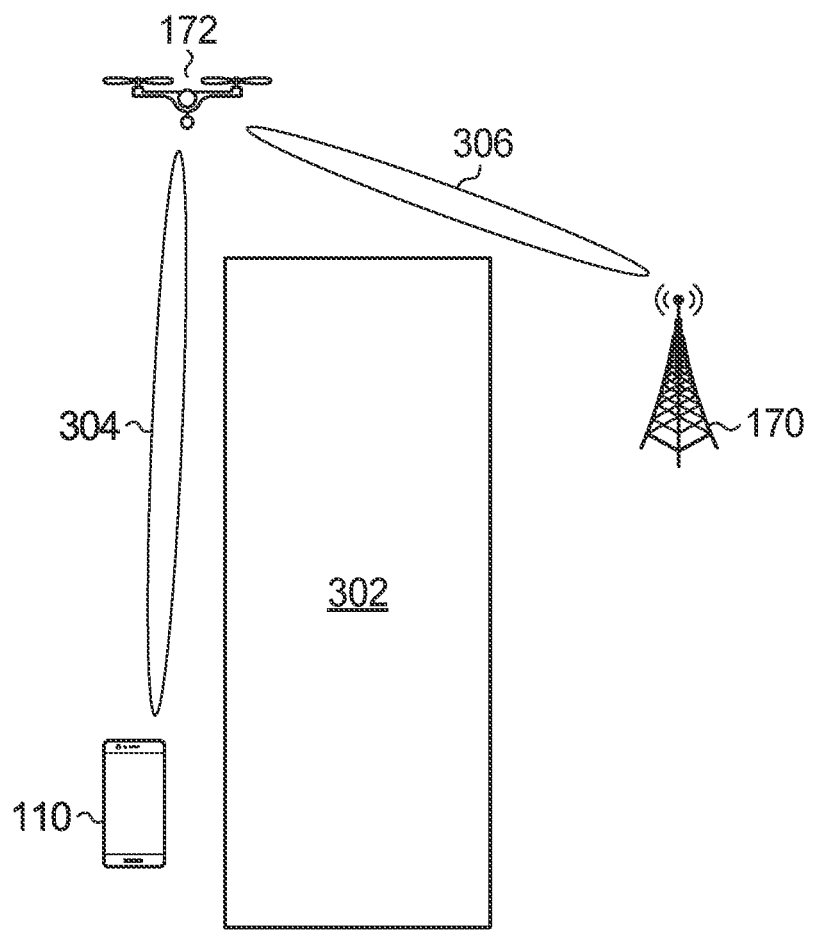
FIG. 6 illustrates a deployment of a NT-TRP, according to one embodiment.

FIG. 6 illustrates a deployment of NT-TRP 172, according to one embodiment. The communication between UE 110 and T-TRP 170 is not as effective because of the presence of a building 302. Therefore, the UE 110 primarily communicates with NT-TRP 172 via wireless link 304. The NT-TRP 172 may then communicate with T-TRP 170 over backhaul wireless link 306. In some embodiments, the NT-TRP 172 may relay signaling and data between the UE 110 and the T-TRP 170. The wireless links 304 and 306 may be line-of-sight (LOS), which may allow for more effective communication.

In some embodiments, the NT-TRP 172 might be specifically deployed to only communicate with UE 110. In other embodiments, the NT-TRP 172 might be specifically deployed to only communicate with a particular group of UEs that includes UE 110. In other embodiments, the NT-TRP 172 might be deployed to a particular region to serve any UEs that may be in that region. For example, the region may be one in which UE traffic demand is determined to be high. The UE 110 may happen to be in that region and decides to, or is instructed to, communicate with NT-TRP 172.

In some embodiments, the network may determine that UE traffic demand is high in a particular region based on the quantity and/or density of UEs located in that region. For example, the network may determine the location of each of a plurality of UEs being served by one or more T-TRPs. Based on knowledge of the location of each of the UEs, the network may determine that a large number of UEs exceeding a certain threshold are in close proximity to each other. The region encompassing those large number of UEs in close proximity may then be determined to be a region in which UE traffic demand is high.

A non-exhaustive list of example ways in which a network may determine the location of a UE is as follows:

- GPS coordinates of the UE may be transmitted to the T-TRP 170, and the GPS coordinates may then be used to determine the location of the UE.
- The use of positioning reference signals, e.g. the UE transmits a positioning reference signal (PRS) to each of a plurality of T-TRPs, and the network uses the known location of those T-TRPs and the time difference between the times at which each PRS was received in order to estimate the location of the UE. The opposite may also occur, e.g. the plurality of T-TRPs each transmit a respective PRS that is received by the UE, and then the UE reports the time difference between the received PRSs to the network, which is then used to estimate the location of the UE.
- UE positioning sensing by a T-TRP, e.g. using radio wave measurements (e.g. radar), and/or acoustic measurements (echolocation), and/or detecting Wi-Fi signals, and/or lidar measurements, etc. For example, a T-TRP performs a beam sweep of radio waves, e.g. radar, and receives a reflection back from a particular direction having a strong reflective signal. The reflected signal is interpreted as the presence of a UE and is used to estimate the location of that UE.
- Tracking a UE's previous one or more locations and, based at least on that tracking data, predicting the location of the UE, e.g. using artificial intelligence, such as a machine learning algorithm in which the past locations of a UE are input into a trained machine learning algorithm that returns a prediction of the future or current location of that UE.

A UE periodically transmits a signal to a T-TRP, e.g. in reply to an interrogator signal. The contents and/or strength and/or direction of the signal is indicative of the location of the UE.

A UE senses its environment, e.g. using radio wave measurements (e.g. radar), and/or acoustic measurements (echolocation), and/or detecting Wi-Fi signals, and/or lidar measurements, etc. The results of the sensing measurements provide an indication of the environment surrounding the UE. Information relating to the environment is then transmitted to the T-TRP and is used by the network to estimate the location of the UE.

A location of a UE may be expressed in precise terms, e.g. particular GPS coordinates, or (x,y,z) coordinates in relation to a T-TRP. A location of a UE may instead be expressed in more general terms, e.g. within a particular or general area or region.

In some embodiments, the current location of UEs might not be used to determine regions in which UE traffic demand is considered to be high. For example, patterns may have previously been detected by the network and then subsequently used in order to predict or determine regions in which UE traffic demand is currently high. For example, traffic patterns may be analyzed over the course of many days or weeks, and it may be observed that a particular highway has high UE traffic demand between 4-6 pm Monday to Friday and that a particular area of downtown has high UE traffic demand between 12 pm-1 pm Monday to Friday. UE traffic demand may then subsequently be determined to be high during those days/times, regardless of how many UEs are actually located in those regions on any given day/time. In some embodiments, artificial intelligence algorithms, such as a machine learning algorithm, may be used to decide that a region has (or may have) high UE traffic demand. For example, the training of the machine learning algorithm may uncover patterns between UE traffic demand in certain regions based on various input factors, such as weather, day of year, day of week, time of day, etc. Post-training, the machine learning algorithm may then be used to determine or predict that a particular region has high UE traffic demand. The determination might or might not also be made on the basis of number of UEs actually located in that region on that day/time.

If a NT-TRP 172 is to be deployed to a particular region, then the network might determine where, specifically within that region, the NT-TRP 172 is to be located. In some embodiments, the NT-TRP 172 is instructed to locate itself vertically above the center of the region. In some embodiments, artificial intelligence algorithms, such as a machine learning algorithm, may be used determine the position at which the NT-TRP 172 is to be specifically located within the region. For example, a machine learning algorithm may uncover patterns during training, which are then used post-training to determine the position at which the NT-TRP 172 is to be located within the region. In some embodiments, network planning may also or instead be used to determine the position at which the NT-TRP 172 is to be located within the region. For example, if a building is known to be located at a particular spot in the region, the NT-TRP 172 might be deployed at a location in the region that is not directly above the building, e.g. so that more UEs in the region have a direct line-of-sight (LOS) to the NT-TRP 172.

If a NT-TRP 172 is to communicate with a particular UE, e.g. UE 110, then in some embodiments the network may determine where to specifically locate the NT-TRP 172 in relation to that UE 110. In some embodiments, the NT-TRP 172 may be located at a position in the sky that is predicted or determined to have good LOS communication with the UE 110. A non-exhaustive list of example ways in which a network may determine where to specifically locate the NT-TRP 172 in relation to UE 110 is as follows:

The network may instruct the NT-TRP 172 to position itself vertically above the determined or estimated location of UE 110.

The UE 110 senses its environment, e.g. using radio wave measurements (e.g. radar), and/or acoustic measurements (echolocation), and/or detecting Wi-Fi signals, and/or lidar measurements, etc. The sensing indicates that certain directions are clear, and other directions have obstructions. For example, the UE 110 may transmit one or more radio waves, e.g. radar, and receive a reflection back in some directions. The directions in which reflections are received are determined to be directions that are obstructed and therefore not LOS. The UE 110 provides the results of the sensing to the network, e.g. by transmitting the results to the T-TRP 170. The network instructs the NT-TRP 170 based on the results of the sensing. For example, the NT-TRP 170 is instructed to locate itself in a direction in relation to UE 110 that was not determined to be obstructed.

The network may use network planning. For example, if UE 110 is located adjacent a known building, then the NT-TRP 177 may be instructed to locate itself away from the building.

Positioning sensing by the T-TRP 170 and/or by the NT-TRP 172, e.g. using radio wave measurements (e.g. radar), and/or acoustic measurements (echolocation), and/or detecting Wi-Fi signals, and/or lidar measurements, etc. For example, the T-TRP 170 and/or the NT-TRP 172 performs a beam sweep of radio waves, e.g. radar, and receives a reflection back from a particular direction having a strong reflective signal. The fact that the reflection has a relatively strong signal is interpreted as the presence of a UE, and the direction of reflection indicates the beam direction of the UE. The T-TRP 170 and/or NT-TRP 172 then determines that the UE present in that direction is UE 110, e.g. based on the known or expected location of UE 110, or another method, e.g. the T-TRP 170 transmitting a request for the UE ID in that beam direction and in response the UE 110 transmitting its UE ID to the T-TRP 170. The NT-TRP 172 is then positioned in the vicinity of UE 110 and specifically at a location such that NT-TRP 172 is in the same direction, relative to UE 110, as the strongest reflection received from UE 110.

In some of the examples above, the network uses the location of the UE 110. Example ways in which the network may determine the location of a UE are explained earlier.

Beam Angle Information for Communicating with NT-TRPs

In some embodiments, the network transmits, to UE 110, an indication of the beam direction to use to communicate with NT-TRP 172. The indication of beam direction may be used by the UE 110 to implement a receive beam for receiving a downlink transmission from the NT-TRP 172. The indication of beam direction may also or instead be used by the UE 110 to implement a transmit beam for sending an uplink transmission to the NT-TRP 172.

In some embodiments, the indication of beam direction may be expressed explicitly, e.g. via an absolute value, such as specifying an angle in relation to one or more origin or reference points. For example, the indication may be expressed in terms of beam angle information (BAI), e.g. the angle of the beam in terms of azimuth angle and/or zenith angle. In the remaining embodiments, BAI will be used and expressed in terms of azimuth and/or zenith angle in relation to a predefined origin. However, other methods of indicating beam direction are also contemplated, which might not include using the azimuth and/or zenith angle. For example, an indication of beam direction may be expressed in terms of (x, y, z) coordinates, spherical coordinates, a 3D vector, etc. In some embodiments, the beam direction might only be indicated in a 2D plane, e.g. only azimuth angle or only zenith angle or only (x, y) coordinates, etc.

In some embodiments, e.g. as described below in relation to FIGS. 7 to 12, the BAI may be expressed as a quantized angular direction. For example, a range of angular directions in the form of a set of quantized angular directions may be configured, and the BAI indicated is one quantized angular direction selected from the set of quantized angular directions.

In some embodiments, the BAI is determined based on the known or predicted location of UE 110 in relation to NT-TRP 172. For example, the network determines the location of UE 110 using any one of the methods described earlier. The network also knows the location of NT-TRP 172, e.g. because the network instructed the NT-TRP 172 to fly to a specific location. The network can therefore determine the line-of-sight (LOS) direction between the location of UE 110 and the location of NT-TRP 172. The direction may be determined by comparing the location of the UE 110 to the location of the NT-TRP 172, and expressing the difference between the two locations in directional terms, e.g. in terms of azimuth and/or zenith angle. The LOS direction may therefore be expressed in terms of BAI, e.g. in terms of azimuth angle and zenith angle. The BAI is then used to implement transmit and/or receive beams for when the UE 110 and the NT-TRP 172 are communicating with each other. For example, the BAI may be used by the UE 110 to implement a receive beam and/or a transmit beam that is pointed in the direction of the NT-TRP 172. Additionally, or instead, the BAI may be used by the NT-TRP 172 to implement a receive beam and/or transmit beam that is pointed in the direction of the UE 110.

In some embodiments, the T-TRP 170 transmits the BAI to UE 110, and then the UE 110 uses the BAI to implement a receive beam in the direction specified by the BAI in order to receive information from the NT-TRP 172, e.g. to receive a synchronization signal transmitted from NT-TRP 172 and/or to receive a reference signal transmitted by NT-TRP 172. In some embodiments, the UE 110 may subsequently then implement a transmit beam in the direction specified by the BAI to transmit information to the NT-TRP 172.

In some embodiments, the BAI is expressed as a quantized angular direction. The granularity of the BAI is a function of the level of quantization used to represent the BAI. Different levels of quantization may allow for different levels of BAI accuracy or precision. In general, there is a trade-off between overhead (more bits) and BAI accuracy or precision. In some embodiments, the BAI may be a bit representation of an accurate, e.g. exact or near-exact, beam direction between UE 110 and NT-TRP 172. In other embodiments, the BAI may be a bit representation of a general beam direction between UE 110 and NT-TRP 172, which may allow for fewer bits to communicate BAI. In some embodiments, the number of bits used to represent BAI may be configurable, e.g. using higher-layer signaling such as radio resource control (RRC) signaling or in a medium access control (MAC) control element (CE).

Figure 7:
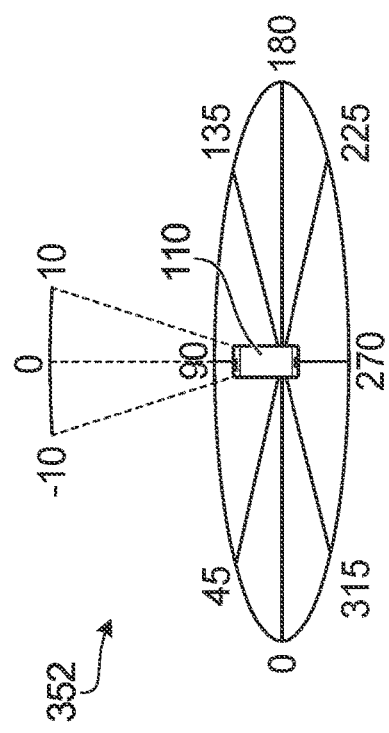
FIGS. 7 and 8 illustrate a beam direction defined in terms of zenith angle and azimuth angle, according to one embodiment.

In some embodiments, a predefined mapping exists between different beam angles or ranges of angles and different bit values. Then, on a dynamic basis, the T-TRP 170 sends, to UE 110, the bit value corresponding to the angle or range of angles that most closely corresponds to the beam direction between the UE 110 and the NT-TRP 172. The bit value is the BAI expressed as a quantized angular direction. For example, FIG. 7 illustrates a volume of space 352 in which a beam direction is defined in terms of zenith angle direction and azimuth angle direction. The origin for the zenith angle measurement is defined as the point vertically above the location of UE 110. Selected zenith angles between −10 degrees and +10 degrees are each mapped to a respective different 4-bit value in the manner shown in table 354. Mapping to zenith angles between −10 to +10 degrees is only an example, e.g. a larger or smaller range of zenith angles may be defined, depending upon how large or small of a region the NT-TRPs may be located above a UE's upper hemisphere. Similarly, the specific quantization and mapping illustrated in table 354 is only an example. A larger number of bits may be used for more granularity, or a smaller number of bits may be used for less granularity. The origin for the azimuth angle measurement may be defined in relation to a particular direction, e.g. North or the direction of the T-TRP 170. The azimuth is partitioned into eight different angle ranges, each range spanning 45 degrees. Each range of azimuth angles is mapped to respective different 3-bit value in the manner shown in table 356. The exact bit value mapping, and the size of each range of azimuth angles, is only an example. For example, a larger number of bits may be used for more granularity, or a smaller number of bits may be used for less granularity. In general, there is a trade-off between overhead and granularity/quantization. The predefined mappings shown in tables 354 and 356 are stored in memory of the UE 110 and also stored in memory at the network side, e.g. in T-TRP 170. The predefined mappings shown in tables 354 and 356 may be fixed or configurable. If the predefined mappings are configurable, then they might be configurable on a semi-static basis, e.g. in higher-layer signaling such as RRC signaling or in a MAC CE.

The mappings in tables 354 and 356 are an example of a set of quantized angular directions defining a range of angular directions. For example, the set includes the 15 zenith quantized angular directions: −10 degrees (represented by bit value 1111), −8 degrees (represented by bit value 1101), . . . , +8 degrees (represented by bit value 0101), and +10 degrees (represented by bit value 0111). The set further includes the 8 azimuth quantized angular directions: 0-44 degrees (represented by bit value 000), . . . , 315-359 degrees (represented by bit value 111). In some embodiments, the set of quantized angular directions may include only table 354 or only table 356. The set may be signaled semi-statically, e.g. in higher layer signaling, to UE 110 and stored in the memory of UE 110. Then, the set is used on a dynamic basis, e.g. using DCI, to indicate a particular quantized angular direction from within the set of quantized angular directions.

Figure 8:
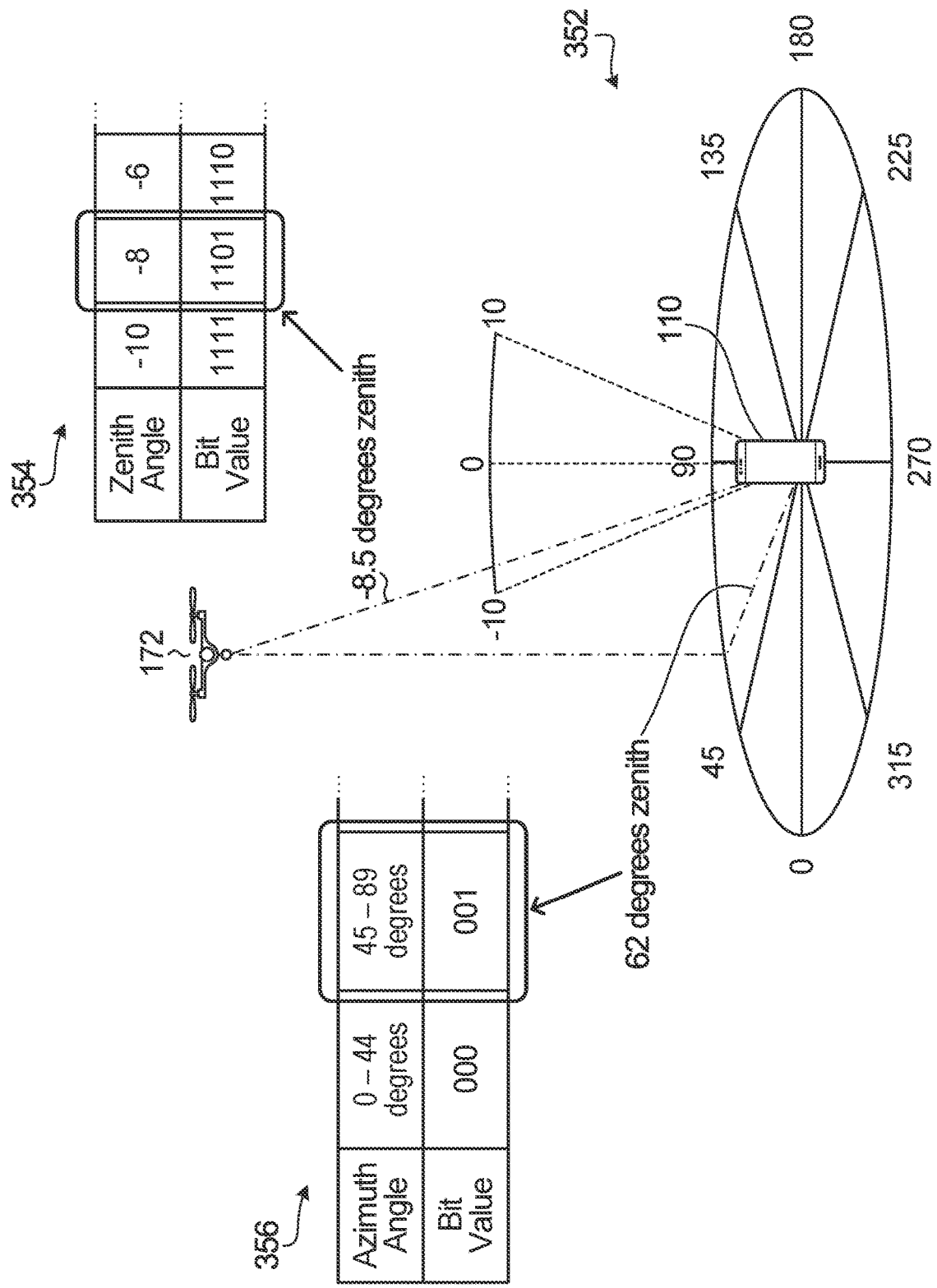

FIG. 8 illustrates an example of dynamic use of tables 354 and 356 in order to communicate the BAI (in terms of quantized angular direction) to UE 110. Based on the location of UE 110 and NT-TRP 172, the network determines that the beam direction between UE 110 and NT-TRP 172 is −8.5 degrees in the zenith and 62 degrees in the azimuth. The zenith angle −8.5 degrees is closest to −8, and so table 354 is used by the network to map −8.5 degrees to bit value 1101. The azimuth angle 62 degrees falls within the range of 45-89 degrees, and so table 356 is used by the network to map 62 degrees to the bit value 001. The pair (1101, 001) is the BAI (in terms of quantized angular direction), which is then transmitted to UE 110. The UE 110 then uses the pair (1101, 001) to map to −8 degrees zenith direction and between 45-89 degrees azimuth direction. The UE 110 then implements receive beamforming having a receive beam pointed in the direction of −8 degrees zenith and between 45-89 degrees azimuth. In some embodiments, the UE 110 may steer the receive beam to the middle of the 45-89 degrees range, e.g. 67.5 degrees azimuth direction.

Using the receive beam, the UE 110 may then attempt to receive a transmission from the NT-TRP 172. For example, the UE 110 may first locate one or more synchronization sequences transmitted from the NT-TRP 172, and then use the one or more synchronization sequences to synchronize with the NT-TRP 172 in the downlink. However, synchronizing with the NT-TRP 172 might not be necessary in some embodiments, e.g. if the UE 110 is already synchronized with the T-TRP 170 and the downlink timing of the T-TRP 170 and the NT-TRP 172 is the same. The UE 110 may next detect a reference signal transmitted by the NT-TRP 172, e.g. in order to perform channel estimation. The reference signal may be a channel state information reference signal (CSI-RS). In some embodiments, the T-TRP 170 may transmit, to UE 110, an indication of the downlink time-frequency resource at which the reference signal transmitted by NT-TRP 172 is located. In other embodiments, the time-frequency location of the reference signal may be predefined and already known by the UE 110. In some embodiments, the T-TRP 170 may transmit, to UE 110, an indication of the reference signal sequence of the reference signal transmitted by NT-TRP 172. In other embodiments, the reference signal sequence may be predefined or determined using the transmission sent by the NT-TRP 172. In some embodiments, upon synchronizing with the NT-TRP 172 and performing channel estimation, the UE 110 may subsequently receive other control information and/or data from the NT-TRP 172 on the receive beam. In some embodiments, the UE 110 may subsequently send an uplink transmission to the NT-TRP 172, e.g. to transmit data or control information to the network. The UE 110 may send the uplink transmission on a transmit beam that is pointed in the direction specified by the BAI.

In the example explained above in relation to FIG. 8, the receive beamforming and/or transmit beamforming performed by the UE 110 is based on the BAI received from the T-TRP 110. The receive beam and/or transmit beam is pointed in the direction specified by the BAI. Because the BAI indicates the beam direction to/from NT-TRP 172, a single receive beam direction and transmit beam direction is implemented by the UE 110, rather than the UE 110 implementing beam sweeping using multiple receive and/or transmit beams. Overhead may therefore be reduced compared to beam sweeping because, unlike beam sweeping, multiple receive and/or transmit beam directions are avoided.

In some embodiments, a downlink channel may be used by the T-TRP 170 to transmit, to one or more UEs, information for establishing communication with a NT-TRP, e.g. BAI and/or an indication of the time-frequency resource at which the reference signal from the NT-TRP 172 is located, etc. The downlink channel will be referred to herein as a physical aerial channel (PACH), and it may be a control channel, a data channel, or have both a control channel component and a data channel component, e.g. control signaling that schedules the information in a data portion of the channel. Also, in some embodiments, the PACH may instead be a field or portion of another pre-existing downlink channel, e.g. the PACH may be a field or portion of a physical downlink control channel (PDCCH) and/or a physical downlink data channel, e.g. a broadcast channel or a physical downlink shared channel (PDSCH).

Figure 9:
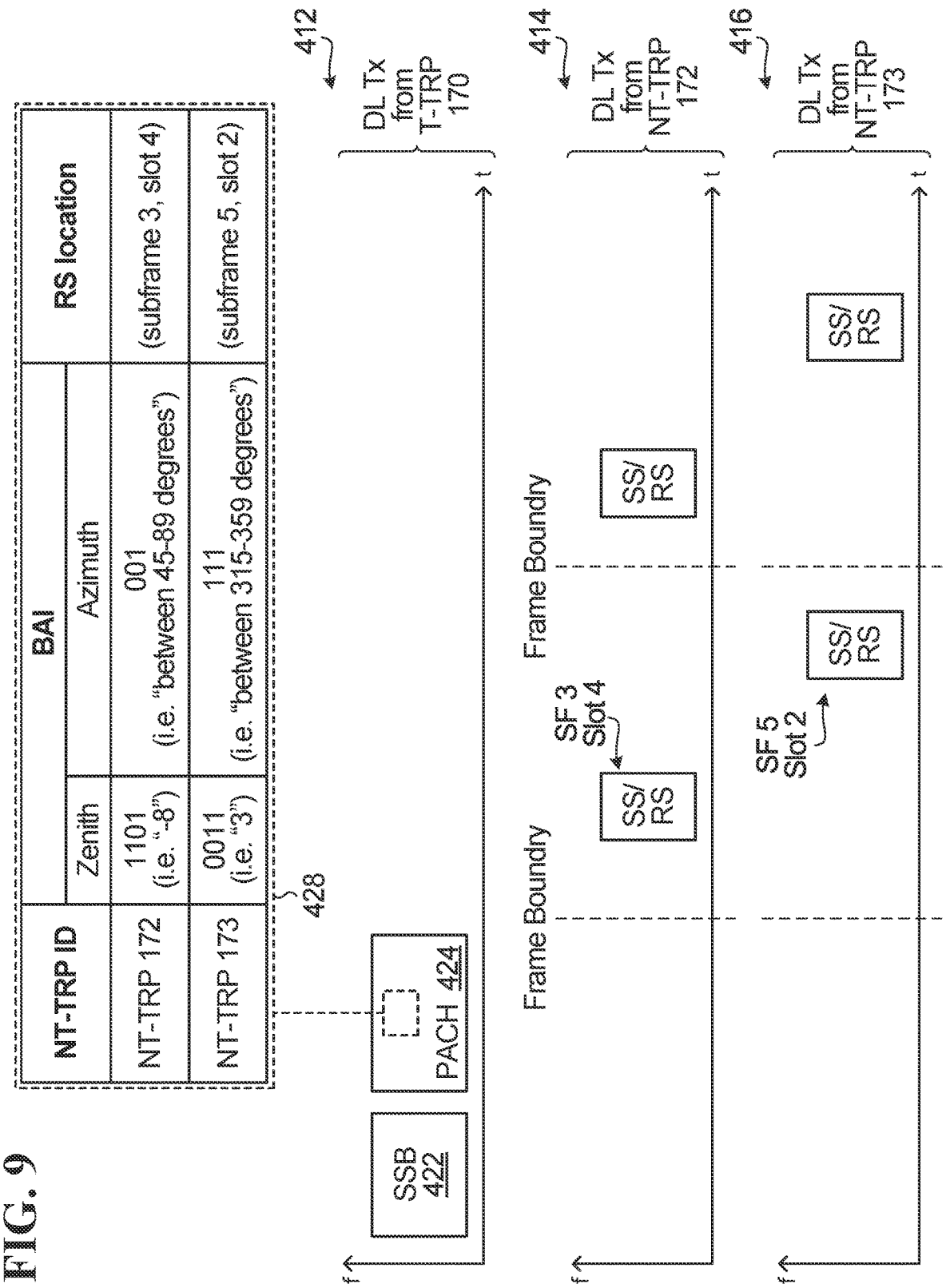
FIGS. 9 and 10 illustrate implementation of a physical aerial channel (PACH), according to various embodiments.

FIG. 9 illustrates an implementation of a PACH, according to one embodiment. In the example described in relation to FIG. 9, two NT-TRPs 172 and 173 are deployed at different locations, each in LOS communication with UE 110.

Time-frequency resources 412 are illustrated that are used for downlink transmission from T-TRP 170. Time-frequency resources 414 are also illustrated that are used for downlink transmission from NT-TRP 172. Time-frequency resources 416 are further illustrated that are used for downlink transmission from NT-TRP 173. In implementation, the time-frequency resources 412, 414, and 416 might or might not partially or fully overlap with each other in time and/or in frequency. For example, the time frequency resources 414 and 416 may overlap in time and frequency, but the downlink transmissions from each of NT-TRP 172 and 173 may be spatially separated, e.g. if NT-TRP 172 and NT-TRP 173 each implement transmit beams in different beam directions.

The downlink transmission sent by T-TRP 170 in time-frequency resources 412 includes a synchronization signal block (SSB) 422, which is used by UEs to perform initial access and connect with the network. In some embodiments, a synchronization signal (SS) burst may be implemented by the T-TRP 170 in which beam sweeping is used by the T-TRP 170 to transmit multiple SSBs, each in a different beam direction. However, for simplicity only a single SSB 422 is illustrated in FIG. 9. Because NT-TRPs 172 and 173 are deployed, a PACH 424 is also transmitted from T-TRP 170 in the downlink time-frequency resources 412. Prior to transmission of the PACH 424, the T-TRP 170 may transmit an indication of whether a PACH will be present in a particular upcoming time period. For example, the T-TRP 170 might only transmit a PACH 424 when NT-TRPs are deployed in the vicinity of UEs being served by T-TRP 170. When the PACH 424 is to be transmitted, an indication in the downlink informs the UEs that the PACH 424 will be present. In some embodiments, the indication may be transmitted in the SSB 422. In some embodiments, the indication may be transmitted as part of system information (SI), e.g. in a master information block (MIB) in SSB 422 or in other SI such as system information block 1 (SIB1). In some embodiments, the indication may indicate information such as the time-frequency resource at which to find the PACH 424 or at which to find the downlink scheduling grant for the PACH 424.

Devices such as TRPs (e.g. T-TRPs and NT-TRPs) and UEs receive various kinds of physical layer signals. Some physical layer signals are signals of interest, e.g. signals that are intended for the UE, whereas some physical layer signals are not signals of interest, e.g. signals that are not intended for the UE and are considered as interference. Devices such as TRPs and UEs will attempt to perform detection on signals of interest, where the task of detection refers to the device attempting to find a given sequence on certain physical layer resources (e.g. time and frequency). This task of detection may require the device to test several hypotheses across degrees of freedom such as the sequence length, the location of physical layer resources, physical layer cell identities in order to find the signal of interest. In some implementations, after the physical layer signal of interest is found, the device attempts to measure the quality of the signal using e.g. the reference signal received power (RSRP)

and if that signal's RSRP is above a certain threshold, then the physical layer signal is considered to be "detected", otherwise it is not considered to be "detected".

In the example illustrated in FIG. 9, the PACH 424 indicates, for each of the deployed NT-TRPs in the vicinity of UE 110, the BAI to be used for beamforming to communicate with that NT-TRP. The PACH 424 also indicates the time-frequency resource at which a reference signal and/or synchronization information is located in the downlink transmission from each NT-TRP.

For example, FIG. 9 illustrates information 428 transmitted in the PACH 424. The information 428 includes, for each of NT-TRPs 172 and 173, the BAI to be used for communicating with that NT-TRP, as well as an indication of the time-frequency resource at which a reference signal from that NT-TRP is located. The BAI includes an indication of the zenith angle direction and the azimuth angle direction, each of which is indicated via a specific bit value using the mapping shown in FIG. 7. The time-frequency resource at which the reference signal transmitted by the NT-TRP is located is indicated in terms of subframe number and slot number within that subframe. In some embodiments, time resources such as OFDM symbols within the slot are given by the slot number, frequency resources such as subcarriers or groups of subcarriers are given by the center frequency of the reference signal and the bandwidth of the reference signal or are given by the lower-edge of the reference signal and the bandwidth of the reference signal. The time-frequency location may be indicated in other ways instead, e.g. expressed in terms of number of OFDM symbols offset from a reference point. The reference point may be the start of a particular time duration, such as the start of a frame, subframe, slot, or min-slot.

In the example illustrated in FIG. 9, the BAI transmitted as part of information 428 is specific to UE 110, e.g. it is based on the angle between the location of UE 110 and the location of each NT-TRP. Therefore, the BAI may possibly be transmitted in a UE-specific downlink transmission. For example, the time-frequency resource in which the BAI is transmitted may be dedicated to UE 110, and/or the downlink transmission carrying the BAI may include the UE identification (ID) of UE 110, and/or the UE 110 may use its UE ID to unmask, e.g. unscramble, the CRC of control information that schedules the time-frequency location of the BAI. The time-frequency resource at which the reference signal from the NT-TRP is located might not be specific to UE 110 and therefore may possibly be broadcast to a group of UEs including UE 110.

In some embodiments, the BAI transmitted in information 428 might not be specific to UE 110. For example, a group of UEs may be relatively close to each other such that the network indicates the same BAI to all UEs in the group. When the BAI is not specific to a particular UE, then the information 428 may be broadcast to a group of UEs. For example, the time-frequency resources for transmitting the information 428 may be accessed by all UEs in the group. The downlink transmission may include a group ID that uniquely identifies the group of UEs, and/or each UE in the group may use the group ID to unmask, e.g. unscramble, the CRC of control information that schedules the information 428.

In the example illustrated in FIG. 9, NT-TRP 172 sends a downlink transmission in downlink time-frequency resources 414. The downlink transmission includes a periodic transmission of a synchronization signal (SS) and a reference signal (RS). The SS may be or include a primary synchronization signal (PSS) and/or a secondary synchronization signal (SSS). The RS may be a CSI-RS. The RS is transmitted in slot 4 of subframe 3 of each frame, as indicated in information 428 transmitted in PACH 424. NT-TRP 173 also sends a downlink transmission in downlink time-frequency resources 416. The downlink transmission from NT-TRP 173 also includes a periodic transmission of a SS and RS. The SS may be or include a PSS and/or a SSS. The RS may be a CSI-RS. The RS is transmitted in slot 2 of subframe 5 of each frame, as indicated in information 428 transmitted in PACH 424. The frames transmitted by NT-TRP 172 and NT-TRP 173 are illustrated in FIG. 9 as being synchronized in time, but this is only an example and is not necessary.

Figure 10:
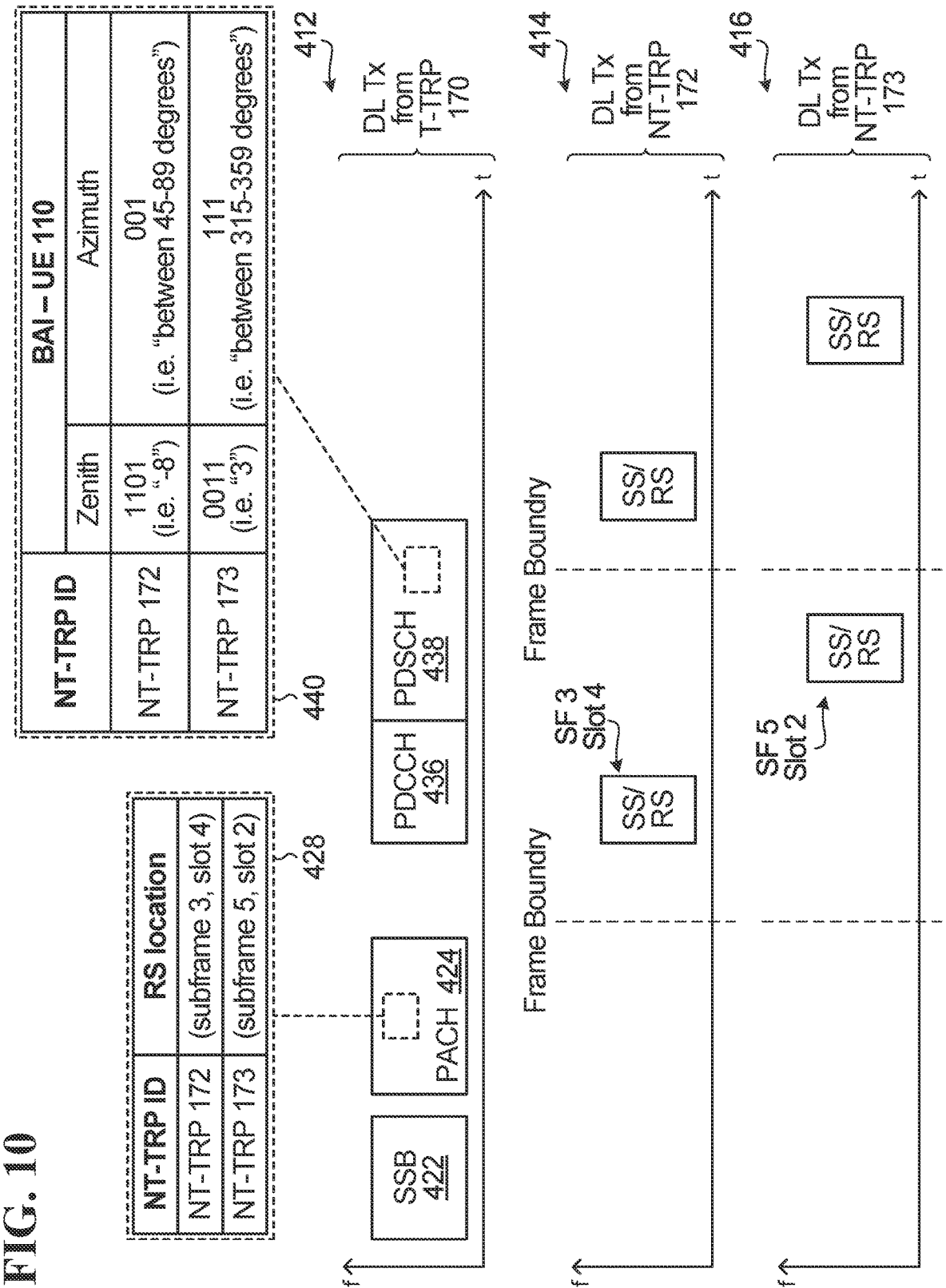

FIG. 10 illustrates a variation of FIG. 9 in which the PACH 424 is a broadcast or groupcast channel carrying information 428 that indicates, to a plurality of UEs, the time-frequency resource at which the RS from each NT-TRP is located. UE-specific transmissions are then separately scheduled in the downlink to indicate, for each UE of the plurality of UEs, the BAI to be used by that UE to communicate with the NT-TRP. Because the plurality of UEs are each at a different location in relation to a given NT-TRP, the BAI information for each UE may be different, although as mentioned earlier in some embodiments the same BAI may be assigned to UEs all close to each other, possibly in a broadcast or groupcast channel. In the example illustrated in FIG. 10, a PDCCH 436 is used to schedule a UE-specific downlink transmission of data for UE 110 in a PDSCH 438. The data for UE 110 scheduled in the PDSCH 438 includes BAI for UE 110, as shown at 440. In a variation, the BAI for UE 110 may be transmitted in the PDCCH 436.

Using the PACH 424, e.g. as per the examples in FIGS. 9 and 10, may allow for increased flexibility in terms of scheduling the reference signals transmitted by the NT-TRPs. Rather than having certain time-frequency resources fixed for transmitting reference signals from NT-TRPs, the time-frequency location of a reference signal from a NT-TRP may be dynamically or semi-statically determined by the network, and then the time-frequency location indicated in the PACH 424.

In some of the embodiments above, e.g. in the examples illustrated in relation to FIGS. 9 and 10, the BAI indicates both zenith angle direction and azimuth angle direction. In other embodiments, to save overhead, the BAI might only indicate zenith angle direction and not azimuth angle direction, or vice versa.

In some embodiments, if NT-TRP 172 and NT-TRP 173 are relatively close to each other, the T-TRP 170 may indicate, to one or more UEs, BAI that is to be used for beamforming for communication with both NT-TRP 172 and NT-TRP 173. For example, if in FIG. 9 NT-TRP 173 was close to NT-TRP 172, then the information 428 in PACH 424 might only indicate the zenith and azimuth angle for NT-TRP 172 along with an indication that that BAI also applies to communication with NT-TRP 173. In some embodiments, the time-frequency resource at which the reference signal from NT-TRP 172 is located may be the same as the time-frequency resource at which the reference signal from NT-TRP 173 is located, in which case a single indication of the location may apply to both NT-TRPs 172 and 173. For example, the PACH 424 may include the reference signal location "(subframe 3, slot 4)" along with an indication that this reference signal location applies for the downlink transmission from all NT-TRPs.

Beam Steering by the NT-TRPs

In some embodiments described above, the UE 110 uses BAI received from the T-TRP 170 in order to implement a receive beam and/or a transmit beam in the direction of NT-TRP 172. In general, the NT-TRP 172 might or might not also perform beamforming. If the NT-TRP 172 also implements beamforming, then in some embodiments the BAI sent to the UE 110, or a variation thereof, is also transmitted from the T-TRP 170 to the NT-TRP 172 over backhaul, e.g. over link 306 of FIG. 6. The NT-TRP 172 may then use the BAI to implement a receive beam and/or a transmit beam in the direction of the UE 110, e.g. so that there is beam correspondence. In some embodiments, the same BAI sent to the UE 110 in the downlink from the T-TRP 170 is also transmitted to the NT-TRP 172 over backhaul. For example, in FIG. 9 the BAI "(1101, 001)" is transmitted from T-TRP 170 to UE 110, which corresponds to −8 degrees zenith direction and 45-89 degrees azimuth direction. The BAI "(1101, 001)" may also be transmitted to the NT-TRP 172, and the NT-TRP 172 may store the mappings shown in tables 354 and 356 in order to translate "(1101, 001)" into a beam direction. The NT-TRP 172 may then send a transmission to UE 110 using a transmit beam based on the BAI and/or receive a transmission from UE 110 using a receive beam based on the BAI. The origin/reference point for the zenith and azimuth angle measurements for the NT-TRP 172 may be different from (and generally the opposite of) the origin/reference point for the UE 110, in order to ensure that the NT-TRP 172 steers its beam in the opposite direction of UE 110 to obtain beam correspondence. For example, the origin point for the zenith angle for NT-TRP 172 may be directly vertically below the NT-TRP 172. In other embodiments, BAI of a different form or value compared to UE 110 is transmitted to NT-TRP 172, but the BAI transmitted to NT-TRP 172 still corresponds to the BAI transmitted to UE 110 so that the beam steering performed by the NT-TRP 172 has correspondence to the beam steering performed by UE 110.

Figure 11:
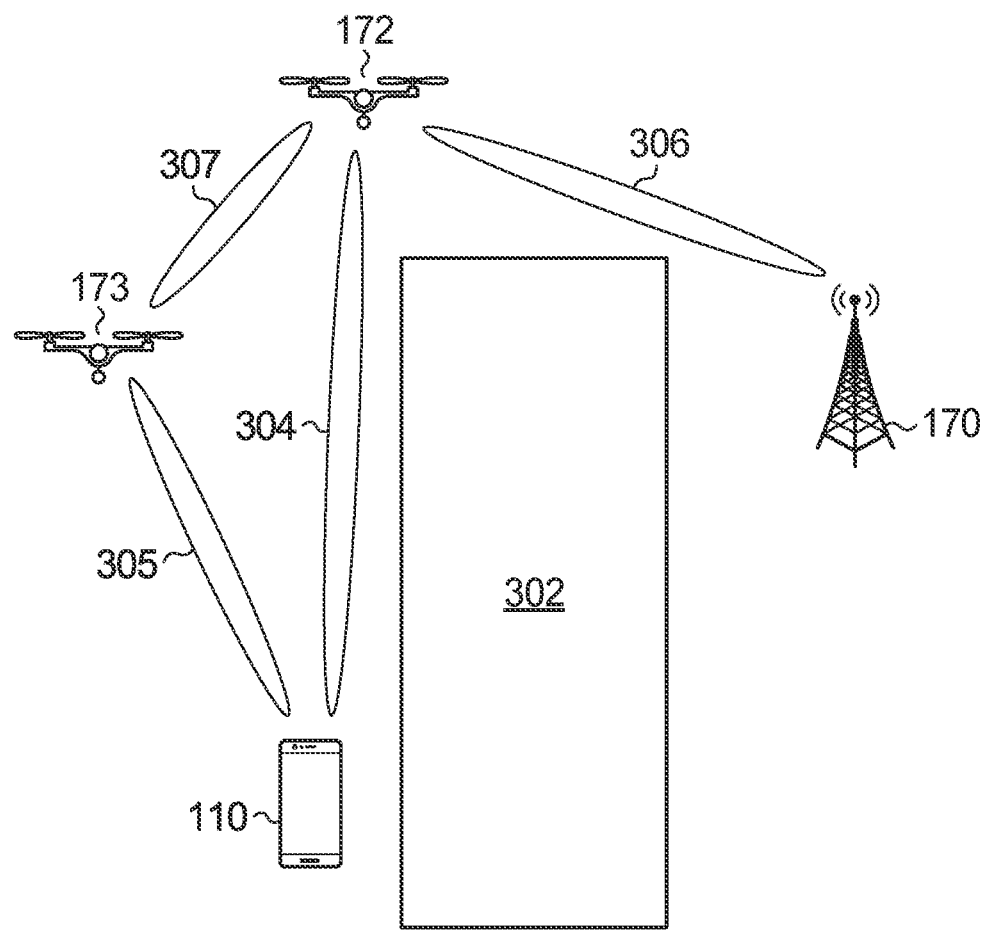
FIG. 11 illustrates a deployment of two NT-TRPs, according to one embodiment.

In some embodiments, NT-TRPs may communicate with each other using beamforming. FIG. 11 illustrates a deployment of two NT-TRPs 172 and 173, according to one embodiment. The UE 110 communicates with NT-TRP 172 over wireless link 304, and the UE 110 communicates with NT-TRP 173 over wireless link 305. Both are LOS connections. The wireless channel between the UE 110 and T-TRP 170 is not LOS and not of high quality because of the presence of building 302. The T-TRP 170 communicates with NT-TRP 172 over backhaul wireless link 306. The NT-TRP 173 and NT-TRP 172 communicate with each other over backhaul wireless link 307. For example, the NT-TRP 172 may relay information between the NT-TRP 173 and the T-TRP 170. Although not shown, the NT-TRP 173 is also able to directly communicate with the T-TRP 170, although the channel between NT-TRP 173 and T-TRP 170 might not be as strong as between NT-TRP 172 and T-TRP 170 because the NT-TRP 173 is farther away from T-TRP 170.

In some embodiments, the T-TRP 170 indicates, to one or both of the NT-TRPs 172 and 173, information for establishing communication with the other NT-TRP, e.g. BAI and/or an indication of the time-frequency resource at which the reference signal from the NT-TRP is located, etc. For example, the T-TRP 170 may indicate, to NT-TRP 172, the BAI to be used by NT-TRP 172 to implement a receive beam and/or transmit beam in the direction of NT-TRP 173. The BAI may be transmitted on backhaul wireless link 306. The BAI may be computed by the network based on the known location of the NT-TRPs 172 and 173. The network knows the location of both NT-TRP 172 and NT-TRP 173 because the network instructed the NT-TRP 172 and NT-TRP 173 to fly to their respective locations. The network may determine the LOS direction between the location of NT-TRP 172 and the location of NT-TRP 173. The LOS direction may be expressed in terms of BAI, e.g. in terms of azimuth angle direction and zenith angle direction. The origin/reference point for the angle measurements may be different compared to the embodiments in which BAI is sent to UE 110.

Figure 12:
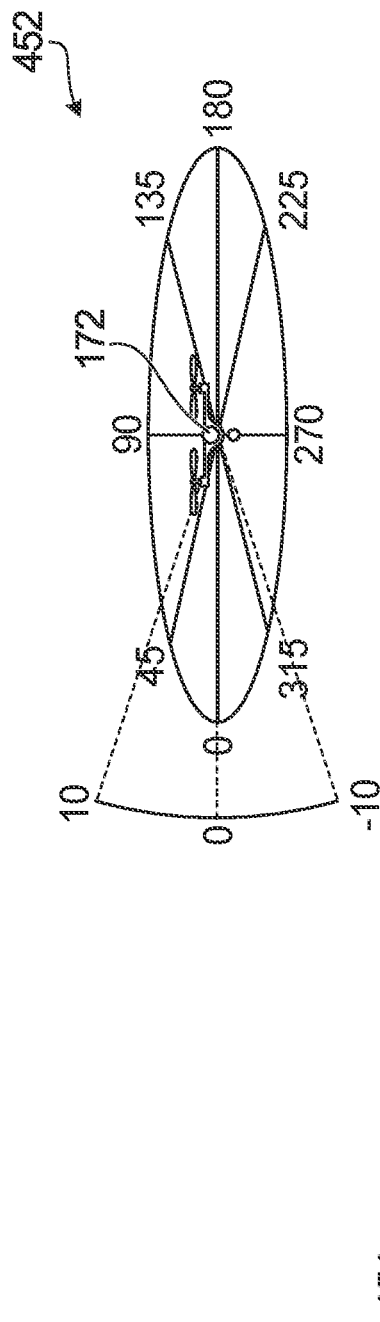
FIG. 12 illustrates a beam direction defined in terms of zenith angle and azimuth angle, according to another embodiment.

For example, FIG. 12 illustrates a volume of space 452 in which a beam direction for NT-TRP 172 to communicate with NT-TRP 173 is defined in terms of zenith angle direction and azimuth angle direction. The origin for the zenith angle measurement is defined as the point horizontally on the horizon, which is different from the origin defined in relation to UE 110, e.g. in FIG. 7. Selected zenith angles between −10 degrees and +10 degrees are each mapped to a respective different 4-bit value in the manner shown in table 454. Mapping to zenith angles between −10 to +10 degrees is only an example, e.g. a larger or smaller range of zenith angles may be defined. Similarly, the specific quantization and mapping illustrated in table 454 is only an example. A larger number of bits may be used for more granularity, or a smaller number of bits may be used for less granularity. The origin for the azimuth angle measurement may be defined in relation to a particular direction, e.g. North or the direction of the T-TRP 170, and the origin may be the same as the origin defined in relation to UE 110 in FIG. 7. The azimuth is partitioned into eight different angle ranges, each range spanning 45 degrees. Each range of azimuth angles is mapped to respective different 3-bit value in the manner shown in table 456. The exact bit value mapping, and the size of each range of azimuth angles, is only an example. For example, a larger number of bits may be used for more granularity, or a smaller number of bits may be used for less granularity. The predefined mappings shown in tables 454 and 456 are stored in memory of the NT-TRP 172 and also stored in memory at the network side, e.g. in T-TRP 170. The predefined mappings shown in tables 454 and 456 may be fixed or configurable. If the predefined mappings are configurable, then they might be configurable on a semi-static basis, e.g. in higher-layer signaling such as RRC signaling or in a MAC CE. The predefined mappings shown in tables 454 and 456 are examples of a set or sets of quantized angular directions defining a range of angular directions.

In operation, the T-TRP 170 may compute the zenith and azimuth angle between NT-TRP 172 and NT-TRP 173 in order to obtain BAI, and then make use of tables 454 and 456 to communicate the BAI (in terms of quantized angular direction) to NT-TRP 172. The NT-TRP 172 may then use the BAI to implement a receive beam and/or transmit beam in the direction of NT-TRP 173. For example, using the receive beam steered in the direction indicated by the BAI, the NT-TRP 172 may attempt to receive a transmission from the NT-TRP 173. For example, the NT-TRP 172 may first locate one or more synchronization sequences transmitted from the NT-TRP 173, and then use the one or more synchronization sequences to synchronize with the NT-TRP 173. However, synchronizing with the NT-TRP 173 might not be necessary in some embodiments, e.g. if the NT-TRP 172 and NT-TRP 173 are already synchronized with each other and the T-TRP 170. The NT-TRP 172 may next detect a reference signal transmitted by the NT-TRP 173, e.g. in order to perform channel estimation for the channel between the two NT-TRPs. The reference signal may be a channel state information reference signal (CSI-RS). In some embodiments, the T-TRP 170 may transmit, to NT-TRP 172, an indication of the time-frequency resource at which the reference signal transmitted by NT-TRP 173 is located. In other embodiments, the time-frequency location of the reference signal may be predefined and already known by the NT-TRP 172. In some embodiments, the T-TRP 170 may transmit, to NT-TRP 172, an indication of the reference signal sequence of the reference signal transmitted by NT-TRP 173. In other embodiments, the reference signal sequence may be predefined or determined using the transmission sent by the NT-TRP 173. In some embodiments, upon synchronizing with the NT-TRP 173 (as necessary) and performing channel estimation, the NT-TRP 172 may subsequently receive other control information and/or data from the NT-TRP 173 on the receive beam. In some embodiments, the NT-TRP 172 may subsequently send a backhaul transmission to the NT-TRP 173. The NT-TRP 172 may send the backhaul transmission on a transmit beam that is pointed in the direction specified by the BAI.

In some embodiments, the BAI used for NT-TRP 172 to communicate with NT-TRP 173, and/or the indication of the time-frequency resource at which a RS from the NT-TRP 173 is located, may be indicated to NT-TRP 172 in a PACH, or something similar, e.g. like in FIG. 9, except the PACH for NT-TRP 172 is transmitted over backhaul link 306.

In some embodiments, the NT-TRP 173 also implements beamforming and therefore may also receive the BAI indicating the beam direction between NT-TRP 173 and NT-TRP 172 and steer a receive beam and/or transmit beam in the direction of NT-TRP 172. If the NT-TRP 173 implements beamforming, then in general the beam the NT-TRP 173 uses to communicate with NT-TRP 172 is different from, and pointed in a different direction from, the beam used by the NT-TRP 173 to communicate with UE 110. In general, the reference signal transmitted by NT-TRP 173 for use by UE 110 for channel estimation is different from the reference signal transmitted by NT-TRP 173 for use by NT-TRP 172 for channel estimation. In general, the channel between the NT-TRP 173 and the UE 110 is different from the channel between the NT-TRP 173 and NT-TRP 172.

Other Variations

In some embodiments described herein, the BAI is transmitted by T-TRP 170 in a PACH. More generally, the BAI may be transmitted in dynamic signaling or in higher layer signaling. An example of dynamic signaling is downlink control information (DCI). The PACH may be dynamic signaling. An example of higher layer signaling is RRC signaling or a MAC CE. Similarly, the indication of time-frequency resource at which a reference signal from a NT-TRP is located may be transmitted by T-TRP 170 in dynamic signaling or in higher layer signaling.

In general, the type and/or format of synchronization signals and/or reference signals transmitted from one NT-TRP to another NT-TRP need not be the same as the type and/or format of synchronization signals and/or reference signals transmitted from a NT-TRP to a UE. Also, in general, the type and/or format of synchronization signals and/or reference signals transmitted from a NT-TRP to a UE need not be the same as the type and/or format of synchronization signals and/or reference signals transmitted from a T-TRP to a UE. For example, the T-TRP 170 may transmit SSBs that each include a PSS, a SSS, and a broadcast channel. However, a NT-TRP might not transmit a SSB at all, or might transmit a modified version of an SSB, e.g. one that does not have a broadcast channel.

In some embodiments, the BAI and/or other information, e.g. the indication of the time-frequency location of a reference signal, may be transmitted using different wireless technologies, e.g. using unlicensed spectrum, such as Wi-Fi. In some embodiments, the BAI and/or other information may be transmitted by multiple T-TRPs, e.g. using coordinated multi-point transmission.

In some embodiments, a NT-TRP may repeat a transmission also sent by a T-TRP, which may be useful in high reliability scenarios. For example, important information for UE 110 may be transmitted both in a downlink transmission from T-TRP 170 and in a downlink transmission from NT-TRP 172.

In some embodiments, BAI may be determined by the UE 110 and used by the UE 110 to steer its receive beam or transmit beam, possibly independent of whether the UE 110 is communicating with a NT-TRP or a T-TRP. For example, the UE 110 may sense its environment, e.g. using radio wave measurements (e.g. radar), and/or acoustic measurements (echolocation), and/or detecting Wi-Fi signals, and/or lidar measurements, etc. The sensing indicates that certain directions are clear, and other directions have obstructions. For example, the UE 110 may transmit one or more radio waves, e.g. radar, and receive a reflection back in some directions. The directions in which reflections are received are determined to be directions that are obstructed and therefore not LOS. The UE 110 then performs receive and/or transmit beamforming in a direction determined to not have an obstruction. The beamforming may be used to communicate with a T-TRP and/or a NT-TRP. The UE 110 may optionally also provide the results of the sensing to the network, e.g. by transmitting the results to the T-TRP 170. The network may then use the results to instruct a T-TRP and/or a NT-TRP to communicate with UE 110 using beamforming that implements a receive or transmit beam in a direction to UE 110 that was not determined to be obstructed.

In many of the embodiments above, the BAI is used for communicating with a NT-TRP, e.g. NT-TRP 172. However, this is not necessary. For example, the BAI may be for communicating with another device, such as a UE or a T-TRP. More generally, the concept of indicating a quantized angular direction described herein, e.g. in relation to FIGS. 7, 8, and 12 and tables 354, 356, 454, and 456, are independent of whether NT-TRPs are present. The quantized angular direction may be used by a first device (e.g. apparatus, UE, network device etc.) to perform directional communication (e.g. beamforming) to communicate with a second device. For example, the directional communication may be implemented via beamforming, e.g. using a receive beam and/or transmit beam pointed in the direction of the second device. The indication of the quantized angular direction does not necessarily need to be transmitted by a T-TRP, but could be transmitted by any device, e.g. a UE, a network device such as an NT-TRP or T-TRP, etc.

In some embodiments, the UE 110 indicates to the network the ability to receive reference signals transmitted by NT-TRPs as part of its capability report to the network. The capability report may be sent to T-TRP 170. A communication with the network may be via T-TRP 170. The T-TRPs and NT-TRPs may be configured to transmit reference signals that are based on different sequences occupying different time-frequency resources.

In some embodiments, as part of its capability report to the network, the UE 110 indicates to the network the maximum number of reference signals transmitted by NT-TRPs that the UE 110 can be configured to detect and measure. In some embodiments, the UE 110 may indicate to the network the maximum number of reference signals transmitted by NT-TRPs that the UE 110 can detect and measure in a given time-frequency resource.

In some embodiments, as part of its capability report to the network, the UE 110 indicates to the network the maximum number of reference signals transmitted by NT-TRPs that the UE 110 can be configured to detect and measure in a pool of reference signals that can be transmitted by T-TRPs and/or NT-TRPs. In some embodiments, the UE 110 can indicate to the network the maximum number of reference signals transmitted by NT-TRPs that the UE can detect and measure in a given time-frequency resource concurrently with reference signals transmitted by T-TRPs in the same time-frequency resource.

In some embodiments, as part of its capability report to the network, the UE 110 indicates to the network the maximum number of BAI indications that can be configured for the UE 110. In one example, the network can configure the UE 110 with one BAI indication for each reference signal transmitted by a NT-TRP for the UE 110 to attempt to detect and measure. In another example, the network can configure the UE 110 with one BAI indication that the UE 110 uses to detect and measure any reference signal transmitted by a NT-TRP.

In some embodiments, as part of its capability report to the network, the UE 110 indicates to the network the maximum number of quantized angular directions that a set or range of quantized angular directions can contain. For example, the UE 110 may indicate the maximum number of entries that a BAI table can contain for azimuth/zenith angle direction indications. As an example, the network can configure the UE 110 with up to a number of bits equal to the logarithmic function in base 2 of the maximum number of entries supported for the BAI table. Examples of BAI tables are tables 354, 356, 454, and 456.

In some embodiments, the UE 110 indicates to the network the maximum number of PACHs that can be indicated to the UE 110 in a synchronization signal as part of its capability report to the network. As an example, the network can configure a T-TRP to send synchronization signals (e.g. SS/PBCH blocks) indicating the presence of up to the maximum number of PACHs supported by the UE 110.

In some embodiments, as part of its capability report to the network, the UE 110 indicates to the network the maximum number of sensing reference signals that the UE 110 can be configured to transmit for the purpose of performing sensing measurements.

In some embodiments, as part of its capability report to the network, the UE 110 indicates to the network the maximum number of sensing reference signals that the UE 110 can be configured to transmit for the purpose of performing sensing measurements from a pool of uplink reference signals (e.g. sounding reference signals). In some embodiments, the UE 110 can additionally or alternatively indicate to the network the maximum number of sensing reference signals that the UE 110 can transmit in a given time-frequency resource concurrently with other uplink reference signals (e.g. sounding reference signals) in the same time-frequency resource.

In some embodiments, as part of its capability report to the network, the UE 110 indicates to the network the maximal range of an angular direction that the UE 110 supports. As an example, the network can configure the UE 110 to perform beamforming in the range of angular direction that is indicated by the network, where the range can be up to the maximal range supported by the UE 110. The UE 110 may determine using e.g. pre-defined rules or methods how to determine individual quantized angular directions and map them to the indicated range of angular directions.

Example Methods

Figure 13:
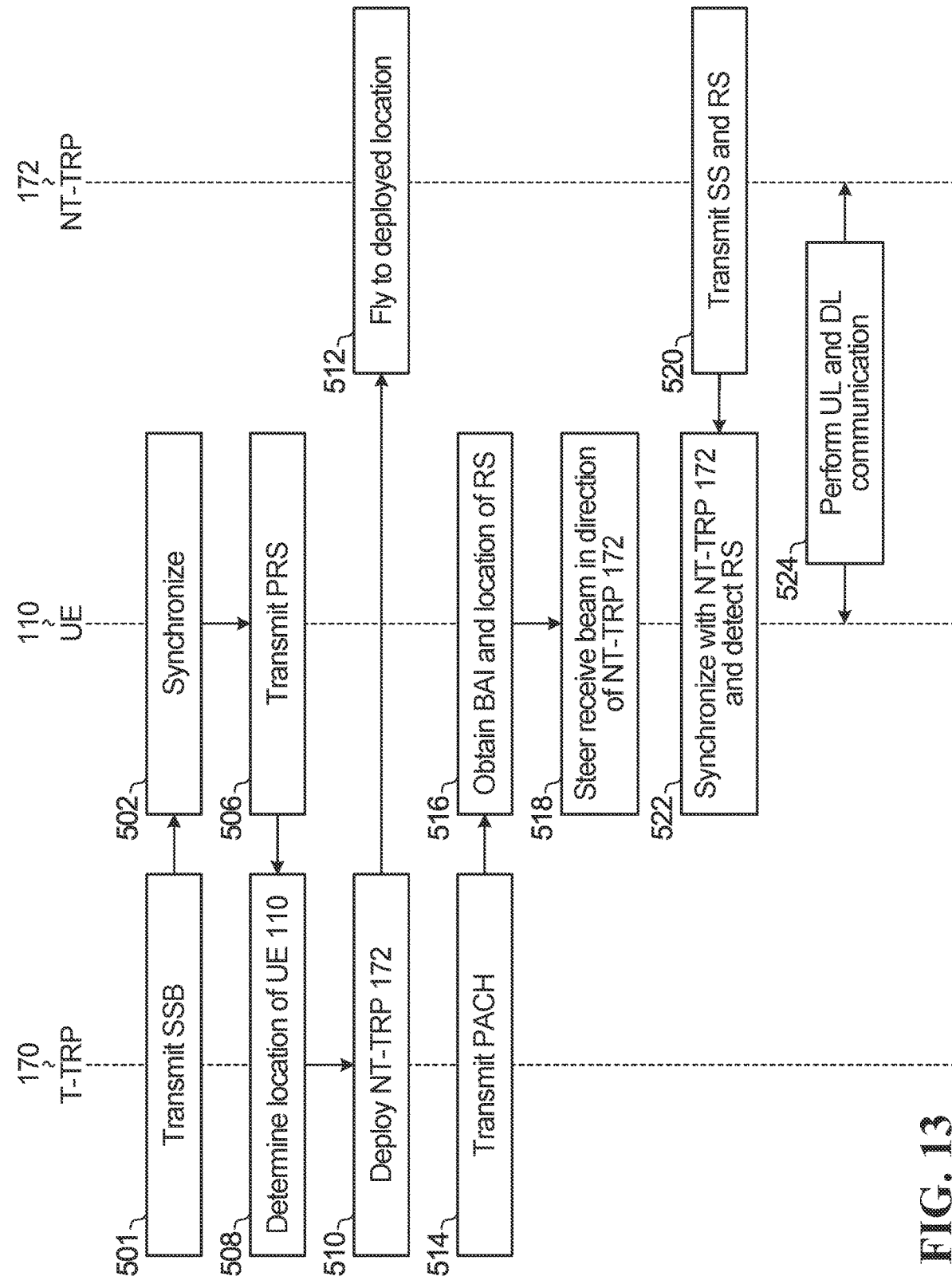

FIG. 13 is a flow diagram illustrating a method performed by T-TRP 170, UE 110, and NT-TRP 172, according to one embodiment.

At step 501, the T-TRP 170 transmits a SSB. The SSB may be an SSB transmitted on a beam of a downlink beam sweeping pattern implemented by T-TRP 170, e.g. as part of a synchronization signal (SS) burst.

At step 502, the UE 110 uses the SSB to synchronize with the T-TRP 170 and connect to the network. Step 502 may include detecting a synchronization sequence, such as a PSS and/or SSS, to determine downlink timing. Step 502 may further include detecting a reference signal transmitted by the T-TRP 170, and using the reference signal to perform channel estimation for the downlink channel from the T-TRP 170. Step 502 may further include decoding system information transmitted by the T-TRP 170, e.g. system information in a MIB and SIB 1.

In some embodiments, step 502 might not be performed for initial network access, but step 502 may instead be performed by UE 110 to connect to the network following a sleep or low power mode.

At step 506, the UE transmits a positioning reference signal (PRS) to each of a plurality of T-TRPs, including T-TRP 170. At step 508, the T-TRPs receiving the PRS, including T-TRP 170, forward the received PRS to a processor on the network side. The processor might or might not be part of T-TRP 170. The processor uses the known location of the T-TRPs and the time difference between the times at which each PRS was received by UE 110 in order to determine the location of the UE 110. The determined location may be an estimated location.

At step 510, the T-TRP 170 deploys NT-TRP 172 to a particular location instructed by the T-TRP 170. The particular location to which the NT-TRP 172 is deployed may be selected based on the location of the UE 110. At step 512, the NT-TRP 172 flies to the deployed location. The NT-TRP 172 is in LOS communication with UE 110.

At step 514, the T-TRP 170 transmits a PACH to UE 110. The PACH includes the BAI representing the direction between UE 110 and NT-TRP 172, which was computed by the network using the location of UE 110 and NT-TRP 172. For example, the BAI may be an indication of zenith angle direction and azimuth angle direction, as described earlier. The PACH also includes an indication of a time-frequency resource at which a reference signal from the NT-TRP 172 is located in the downlink transmission from the NT-TRP 172. In some embodiments, prior to sending the PACH, the T-TRP 170 transmits an indication that informs the UE 110 that a PACH will be transmitted in an upcoming time duration. The indication may indicate the time-frequency resource of the PACH. The indication may be part of the MIB transmitted in an SSB, e.g. in the SSB transmitted in step 501.

At step 516, the UE 110 decodes the following from the PACH: the BAI, and the indication of the time-frequency resource at which the reference signal from the NT-TRP 172 is located. At step 518, the UE 110 uses the BAI to implement receive beamforming in which a receive beam is steered in the direction of the NT-TRP 172. The receive beam is pointed in the direction indicated by the BAI.

At step 520, the NT-TRP 172 transmits a synchronization signal (SS). The NT-TRP 172 also transmits the reference signal at the time-frequency resource indicated in the PACH. At step 522, the UE 110 synchronizes with the NT-TRP 172 using the SS. For example, the SS includes a SS sequence that is detected by the UE 110 and used to determine downlink timing from the NT-TRP 172. The UE 110 also detects the reference signal from the NT-TRP 172 at the indicated time-frequency resource. The reference signal is used to perform channel estimation for the downlink channel from the NT-TRP 172.

At step 524, the UE 110 performs uplink and/or downlink communication with the network via NT-TRP 172. If downlink communication is performed, then the UE 110 may use a receive beam pointed in the direction indicated by the BAI. If uplink communication is performed, then the UE 110 may use a transmit beam pointed in the direction indicated by the BAI.

Figure 14:
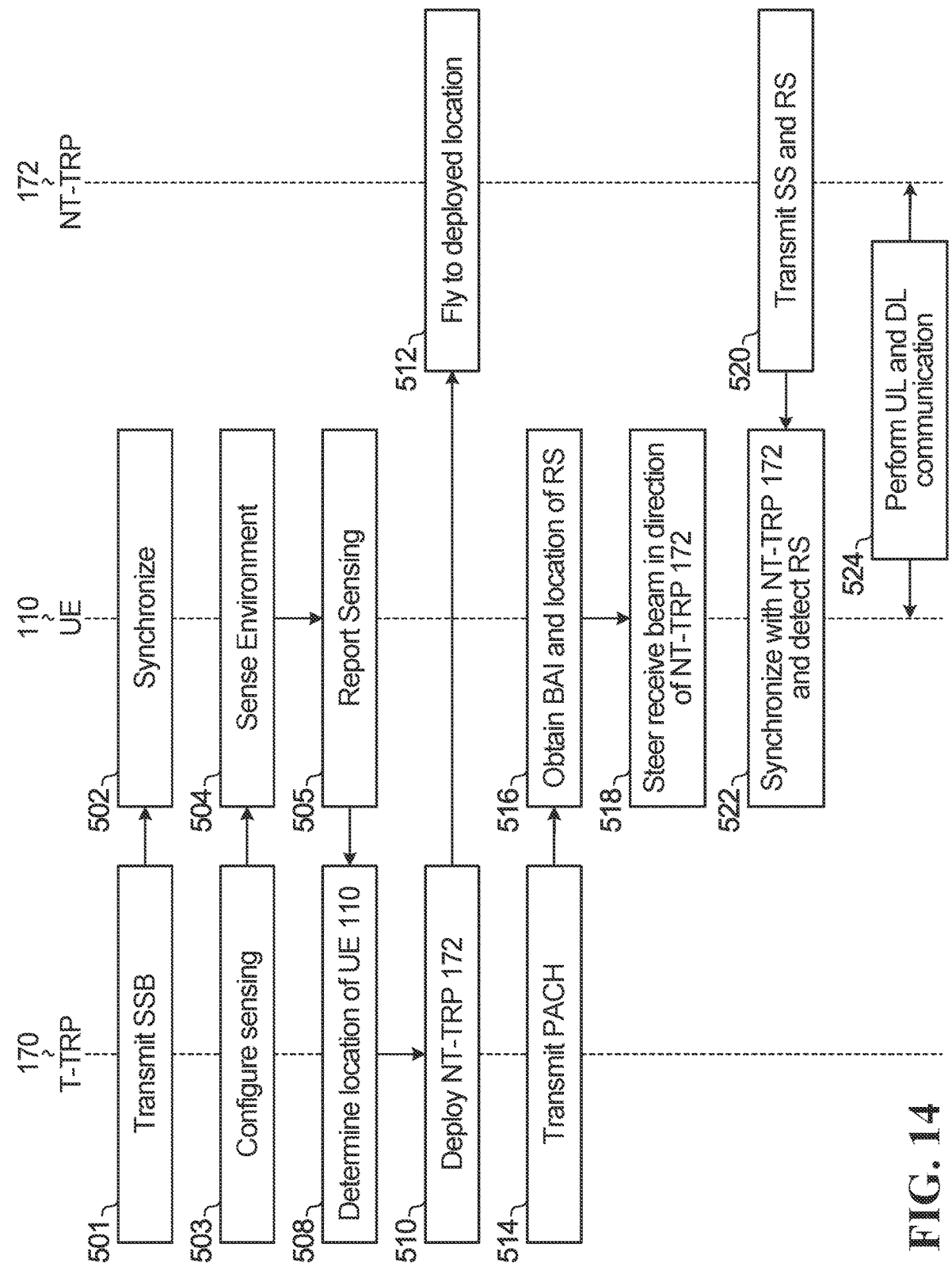

FIG. 14 illustrates a variation of FIG. 13 in which step 506 is replaced with steps 503, 504, and 505. At step 503, the T-TRP 170 configures the UE 110 to perform sensing of the UE's environment. The configuration may be transmitted dynamically, e.g. in downlink control information (DCI), or instead in higher-layer signaling, e.g. in RRC signaling. At step 504, the UE 110 performs the UE sensing measurements described earlier to determine information about its surrounding environment, e.g. to obtain a map of the UE's 3D environment. In one embodiment, the UE 110 may transmit radio waves, e.g. radar, in different directions and, based on the reflections, determine which directions are clear and which directions have obstructions. Instead of radio waves, another technology may be used instead, e.g. echolocation. At step 505, the results of the sensing are reported to the T-TRP 170. At step 508, the location of the UE 110 is determined based, at least in part, on the sensing measurements. For example, the network already has approximate knowledge of the UE's location because the UE 110 is communicating with a certain T-TRP 170, which provides coverage for a certain coverage area. As an example: in beam-based deployments such as in millimeter wave bands, a T-TRP would use several narrow beams to cover a certain coverage area. Additionally, the network also has geographic information about the geography of the coverage area, for instance: the position of buildings, roads and other forms of infrastructure. As an example: sensing measurement reports from the UE 110 can show where the UE 110 detected (or not) ceilings, e.g. an outdoor UE would not be able to detect them because radio waves would never come back towards the UE, whereas an indoor UE would be able to detect ceilings. Coupled with the information of the transmit beams that the UE 110 is able to detect from the T-TRP 170 or that the UE 110 is using to communicate with the T-TRP 110, the network may accurately determine the UE's location. This allows the network to deploy NT-TRP 172 and send BAI information to the UE 110 so that the UE 110 can attempt to detect and measure reference signals from the NT-TRP 170.

The other steps of FIG. 14 are the same as FIG. 13.

Figure 15:
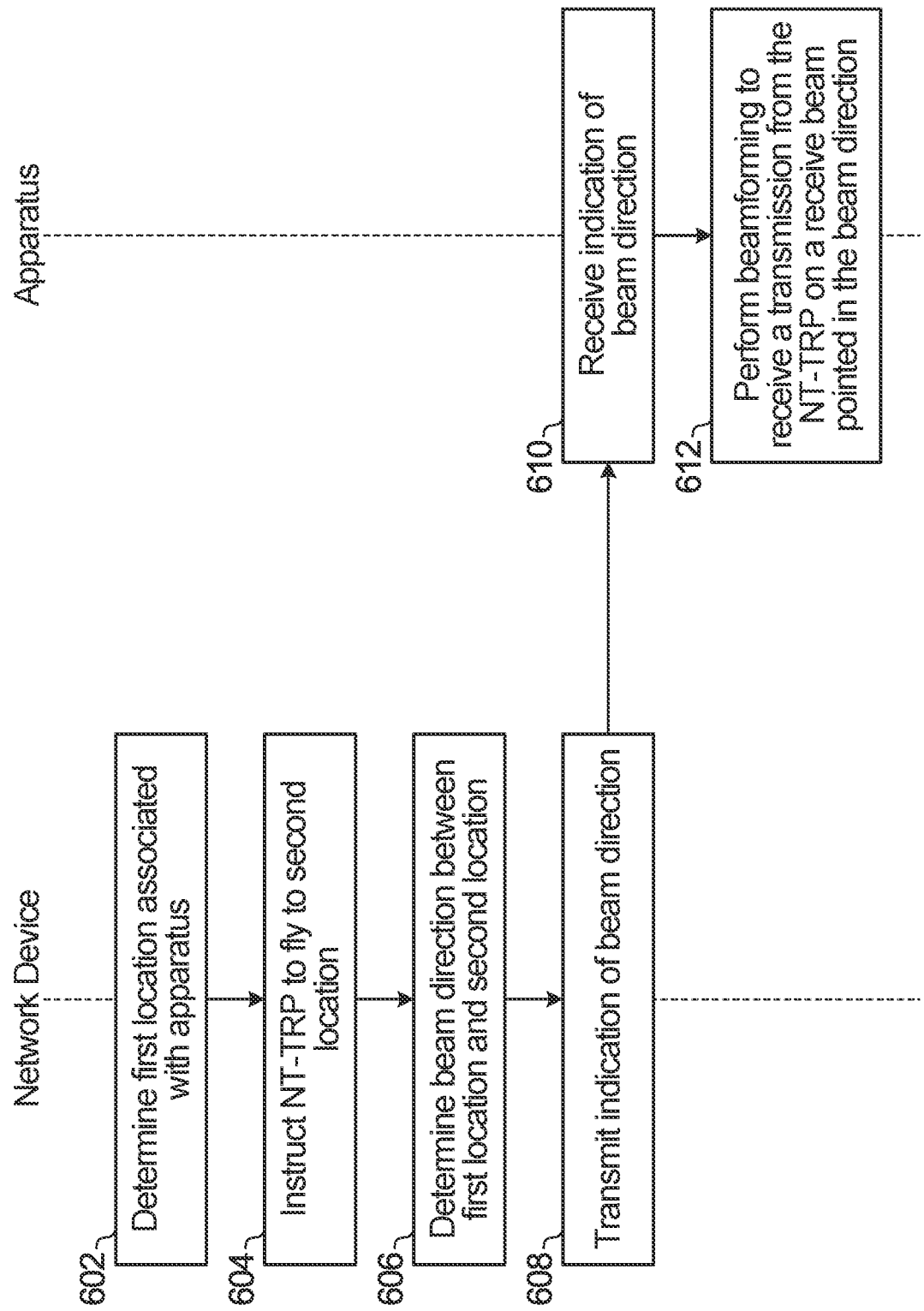

FIG. 15 is a flow diagram illustrating a method performed by a network device and an apparatus, according to one embodiment. The network device may be or include the T-TRP 170. The network device may refer to a distributed device on the network side. For example, the network device may be the T-TRP 170 in FIG. 5, but the processor 260 and scheduler 253 may be located within the network separate from, and in communication with, the transmitter 252 and the receiver 254. The apparatus may be UE 110.

At step 602, the network device determines a first location associated with a location of the apparatus. The first location may be the location of the apparatus itself, e.g. the location of the apparatus in terms of GPS coordinates and/or the location measured in relation to a T-TRP. Example ways to determine the location of an apparatus, such as UE 110, are described earlier. Alternatively, the first location may be a predicted location of the apparatus, e.g. based on the last known location of the apparatus. Alternatively, the first location may be a location within or encompassing a region in which the apparatus is determined or predicted to be located. For example, the first location may be the center of a region that is determined or predicted to have high UE traffic demand, and that includes the apparatus.

At step 604, the network device instructs a NT-TRP to move, e.g. fly, to a second location. The second location is related to the apparatus or to the region in which the apparatus is known or predicted to be located. The second location may be a particular location within a region, e.g. vertically above the center of a region, or at a particular location within the region determined based on network planning, etc., as described earlier. In some embodiments, the second location may be a location specifically based on the location of the apparatus, e.g. vertically above the determined or estimated location of the apparatus, etc., as described earlier. When at the second location, the NT-TRP may be in LOS communication with the first location and/or with the apparatus.

At step 606, the network device determines the angular direction between the first location and the second location. The angular direction will be referred to as the beam direction. The beam direction is determined by comparing the first location to the second location, and expressing the difference between the two locations in directional terms, e.g. in terms of azimuth angle direction and/or zenith angle direction. For example, the beam direction may be the azimuth angle and zenith angle representing the displacement of the second location from the first location, or vice versa.

At step 608, the network device transmits, to the apparatus, an indication of the beam direction. The beam direction may be BAI expressed as a quantized angular direction. The indication may be a bit value representing the quantized angular direction.

At step 610, the apparatus receives, from the network device, the indication of the beam direction. The beam direction is used for communicating with the NT-TRP. The beam direction indicates the direction of the receive beam and/or transmit beam implemented by the apparatus to wirelessly communicate with the NT-TRP.

At step 612, the apparatus performs beamforming to receive, from the NT-TRP, a transmission on a receive beam pointed in the beam direction. The beamforming is receive beamforming that is implemented by performing signal processing on the received signal from the NT-TRP. Based on the indication of beam direction, the signal processing operates on the received signal to cause the received signal to experience constructive interference in the beam direction.

In some embodiments, the apparatus also or instead performs beamforming to transmit, to the NT-TRP, a transmission on a transmit beam pointed in the beam direction. The beamforming is transmit beamforming that is implemented by performing signal processing on the signal to be transmitted. Based on the indication of beam direction, the signal processing operates to cause the transmitted signal to experience constructive interference in the beam direction.

In some embodiments, the method of FIG. 15 further includes receiving, from the network device, an indication of a time-frequency resource at which a reference signal from the NT-TRP is located. The method may then further include the apparatus receiving, from the NT-TRP, the reference signal at the time-frequency resource. The reference signal may be received on the apparatus's receive beam, e.g. on the receive beam implemented in step 612.

In some embodiments, the indication of beam direction may be or include BAI that is quantized and specifies an azimuth angle direction and/or a zenith angle direction. The receive beam in step 612 may then be pointed in that azimuth angle direction and/or zenith angle direction. In some embodiments, the azimuth angle direction and/or a zenith angle direction may be expressed as an exact direction, e.g. 45 degrees azimuth and/or −8 degrees zenith. In other embodiments, the azimuth angle direction and/or the zenith angle direction may be expressed as a range, e.g. 45-89 degrees azimuth and/or −6 to −8 degrees zenith. If an azimuth angle direction and/or zenith angle direction is expressed as a range, then in implementation pointing the receive and/or transmit beam in the direction may involve selecting a value within or representative of that range and pointing the beam in that direction. For example, if the BAI is a quantized value that specifies an azimuth angle direction of 45-89 degrees, then the receive beam and/or transmit beam pointed in the azimuth angle direction may be the middle of the range: 67.5 degrees azimuth.

In some embodiments, a first plurality of bits is used to specify the azimuth angle direction, and a second plurality of bits is used to specify the zenith angle direction, e.g. like the examples in FIGS. 7 to 9. In some embodiments, each different azimuth angle direction corresponds to a respective different bit value of the first plurality of bits, like in table 356 of FIG. 7. In some embodiments, each different zenith angle direction corresponds to a respective different bit value of the second plurality of bits, like in table 354 of FIG. 7.

In some embodiments, the indication of beam direction transmitted in step 608 is specific to the apparatus. For example, the indication of the beam direction may be based on both the location of the apparatus and the location of the NT-TRP, as is the case in step 606 because the first location is associated with the apparatus and the second location is associated with the NT-TRP. In some embodiments, the indication of the beam direction is transmitted in an apparatus-specific downlink transmission from the network device. An apparatus-specific transmission may mean one, some, or all of the following: the transmission is in a time-frequency resource dedicated to the apparatus, e.g. dynamically scheduled for the apparatus; and/or the transmission may be associated with an ID of the apparatus, e.g. the transmission may include an ID that uniquely identifies the apparatus, and/or the transmission may be partially or fully masked using the ID; and/or the transmission is for the single apparatus and not for a group of apparatuses.

FIG. 15 illustrates example operations of both a network device and an apparatus. Example methods will now be explained separately from each perspective of two devices.

FIG. 16 illustrates a method, according to one embodiment. In some embodiments, the method is performed by an apparatus. The apparatus may be a UE or a NT-TRP, or another device. In some embodiments, the method is performed by a circuit chip. At step 652, an indication of a range of angular directions is received. For example, the range of angular directions may be in the form of a set of quantized angular directions. An example of a set of quantized angular directions is the zenith angular directions and/or the azimuth angular directions indicated in the examples in FIGS. 7 and 12. An example of a set of quantized angular directions is the 15 quantized zenith angle directions in table 354 of FIG. 7. In the example, a range of angular directions between −10 degrees and +10 degrees zenith is configured, quantized into 15 direction values within the range, each direction value represented by a different bit value, e.g. "1100" represents the angular direction −4 degrees zenith, etc. The range of angular directions is for communicating with a device. In some of the examples explained earlier, including in FIG. 15, the device is a NT-TRP. However, more generally the device does not have to be a NT-TRP. For example, the device may be a network device or a UE. A network device may be a NT-TRP or a T-TRP. In one example, the range of angular directions may be for receive and/or transmit beamforming when communicating with a UE, or when communicating with a T-TRP.

At step 654, an indication of a quantized angular direction from within the range of angular directions is received. For example, the indication may have been selected, e.g. by a T-TRP, based on the location associated with (e.g. the location of) the apparatus compared to the location associated with (e.g. the location of) the device that the apparatus is to communicate with. In the example in FIG. 7, the indication may be one of the bit values in table 354 and/or one of the bit values in table 356. In the example in FIG. 12, the indication may be one of the bit values in table 454 and/or one of the bit values in table 456.

At step 656, directional communication with the device is performed on an angular direction that is based on the quantized angular direction. The directional communication may be implemented using beamforming. For example, the communication may be or include receiving a transmission from the device, in which case the directional communication may be receive beamforming in which a receive beam is implemented that points in the direction of the quantized angular direction. As another example, the communication may be or include sending a transmission to the device, in which case the directional communication may be transmit beamforming in which a transmit beam is implemented that points in the direction of the quantized angular direction.

In some embodiments, the device is a network device and the directional communication is on an uplink and/or a downlink channel. In some embodiments, the device is a user equipment and the directional communication is on a sidelink channel, e.g. using device-to-device (D2D) communication.

In some embodiments, the device is a NT-TRP, and performing the directional communication includes receiving, from the NT-TRP, a transmission on a receive beam pointed in the quantized angular direction.

In some embodiments, the indication of the quantized angular direction is received from a T-TRP, although this is not necessary. For example, the indication could be received from a NT-TRP or a UE.

In some embodiments, the method is performed by an apparatus, and the indication of quantized angular direction is specific to the apparatus and based on both the location associated with (e.g. location of) the apparatus and the location associated with (e.g. location of) the device. The device may be a NT-TRP. In some embodiments, the indication of quantized angular direction is received in an apparatus-specific transmission, such as an apparatus-specific downlink transmission, e.g. from a T-TRP or another network device.

In some embodiments in which the device is an NT-TRP, an indication may be received that is an indication of a time-frequency resource at which a reference signal from the NT-TRP is located. A receive beam may then be used to receive, from the NT-TRP, the reference signal at the time-frequency resource. The receive beam is (or is part of) the directional communication. The receive beam may be pointed in the quantized angular direction. The method may further include detecting the reference signal from the NT-TRP.

In some embodiments, the indication of quantized angular direction specifies an azimuth angle direction, e.g. if one of the bit values in table 356 or table 456 are sent. Although these tables indicate a range of azimuth angle directions, the quantized angular direction may be one angle representative of or within that range. In some embodiments, the indication of quantized angular direction specifies a zenith angle direction, e.g. if one of the bit values in table 354 or table 454 are sent. In some embodiments, the indication of quantized angular direction specifies both an azimuth angle direction and a zenith angle direction. For example, the indication may be zenith angle 1111 and azimuth angle 000, representing an angular direction of −10 degrees zenith and 0-44 degrees azimuth, e.g. as per the tables in FIGS. 7 and 12.

In some embodiments, a first plurality of bits is used to specify the azimuth angle direction, e.g. like in tables 356 and 456. In some embodiments, a second plurality of bits is used to specify the zenith angle direction, e.g. like in tables 354 and 454. In some embodiments, each different azimuth angle direction corresponds to a respective different bit value of the first plurality of bits, and/or each different zenith angle direction corresponds to a respective different bit value of the second plurality of bits. An example are the tables in FIGS. 7 and 12.

In some embodiments, the indication of the range of angular directions received in step 652 is received on a semi-static basis, e.g. in higher layer signaling, such as RRC signaling or in a MAC CE. In some embodiments, the indication of the quantized angular direction received in step 654 is received on a dynamic basis, e.g. in dynamic signaling, such as in DCI. For example, the tables in FIGS. 7 and/or 12 may be configured on a semi-static basis and indicated in RRC signaling. Particular values within the tables may then be indicated on a dynamic basis in DCI based on the relative location of the two entities communicating with each other, e.g. based on the location of the apparatus in relation to the device.

In some embodiments, a system is provided to perform any of the methods described in relation to FIG. 16. The system may be or include an apparatus, e.g. a UE or a circuit chip. The system may include a memory to store processor-executable instructions. The system may further include a processor to execute the processor-executable instructions to cause the processor to perform the methods described above in relation to FIG. 16. For example, receiving the indication of the range of angular directions in step 652 may include the processor receiving the indication from or at a receiver, e.g. by processing a received transmission from the network, such as decoding the indication in a downlink transmission received from a network device. Receiving the indication of a quantized angular direction in step 654 may include the processor receiving the indication from or at a receiver, e.g. by processing a received transmission from the network, such as decoding the indication in a downlink transmission received from a network device. Receiving may be performed by a receiver or, in the case of a circuit chip, received at or by the processor of the circuit chip. As another example, performing the directional communication in step 656 may include the processor implementing receive beamforming and/or transmit beamforming based on the quantized angular direction.

FIG. 17 illustrates a method, according to another embodiment. In some embodiments, the method is performed by a network device, e.g. a T-TRP or a NT-TRP. In other embodiments, the method is performed by a UE. At step 682, an indication of a range of angular directions is transmitted. For example, the range of angular directions may be in the form of a set of quantized angular directions. An example of a set of quantized angular directions is the zenith angular directions and/or the azimuth angular directions indicated in the examples in FIGS. 7 and 12. The indication is transmitted at least to an apparatus. The indication may be transmitted in an apparatus-specific communication. The indication may instead be groupcast or broadcast and received by multiple apparatuses. The apparatus uses the range of angular directions to communicate with a device. The device may be a NT-TRP, a T-TRP, or a UE.

At step 684, an angular direction is determined. The angular direction may be referred to as a beam direction. The angular direction is between a first location associated with the apparatus and a second location associated with the device. The first location may be the location of the apparatus itself. Alternatively, the first location may be a predicted location of the apparatus, e.g. based on the last known location of the apparatus. Alternatively, the first location may be a location within or encompassing a region in which the apparatus is determined or predicted to be located. The second location may be the location of the device. The second location may be a particular location within a region, e.g. vertically above the center of a region, or at a particular location within the region determined based on network planning, etc. In some embodiments, the second location may be the location of the device, which is also a location specifically based on the location of the apparatus, e.g. vertically above the determined or estimated location of the apparatus. The angular direction may be determined by comparing the first location to the second location, and expressing the difference between the two locations in directional terms, e.g. in terms of azimuth angle direction and/or zenith angle direction.

At step 686, a quantized angular direction from within the range of angular directions is selected based on the angular direction determined in step 684. The selecting may be implemented using a mapping, e.g. a look-up table, such as one or more look-up tables based on the example tables in FIGS. 7 and/or 12. For example, the range of angular directions may comprise the 15 quantized angular directions in table 354 of FIG. 7. The angular direction determined at step 684 may be −9.7 degrees zenith direction, as an example, and the selection may then be implemented by mapping the angular direction −9.7 degrees zenith to the closest quantized angular direction in table 354, which is −10 degrees. The quantized angular direction −10 degrees may be indicated by transmitting its corresponding bit value 1111.

At step 686, the indication of the quantized angular direction is transmitted, e.g. to the apparatus for use by the apparatus to perform directional communication (e.g. beamforming) to communicate with the device.

In some embodiments, the device is a network device or a user equipment. A network device may be a T-TRP or an NT-TRP.

In some embodiments, the device is a NT-TRP, and the method may include instructing the NT-TRP to move to the second location. For example, the NT-TRP may be instructed to move to the second location after step 682 but before step 684.

In some embodiments, the indication of the quantized angular direction is specific to the apparatus. In some embodiments, the indication of the quantized angular direction is transmitted in an apparatus-specific transmission, such as an apparatus-specific downlink transmission.

In some embodiments, an indication is transmitted that is an indication of a time-frequency resource at which a reference signal from the device is located. The device may be an NT-TRP, T-TRP, or UE. The indication may be transmitted to the apparatus.

In some embodiments, the indication of quantized angular direction specifies an azimuth angle direction and/or a zenith angle direction. In some embodiments, a first plurality of bits is used to specify the azimuth angle direction. In some embodiments, a second plurality of bits is used to specify the zenith angle direction. In some embodiments, each different azimuth angle direction corresponds to a respective different bit value of the first plurality of bits, and/or each different zenith angle direction corresponds to a respective different bit value of the second plurality of bits.

In some embodiments, the indication of the range of angular directions is transmitted on a semi-static basis, e.g. in higher layer signaling, such as RRC signaling or in a MAC CE. In some embodiments, the indication of the quantized angular direction is transmitted on a dynamic basis, e.g. in dynamic signaling, such as in DCI.

In some embodiments, a system is provided to perform any of the methods described in relation to FIG. 17. The system may be or include a network device, e.g. a T-TRP or a NT-TRP. The system may be or include a UE. The system may be or include a circuit chip. The system may include a memory to store processor-executable instructions. The system may further include a processor to execute the processor-executable instructions to cause the processor to perform the methods described above in relation to FIG. 17. For example, transmitting an indication of a range of angular directions in step 682 may be implemented by incorporating the indication in signaling, e.g. encoding the indication and including the encoded indication in signaling, which is then sent using a transmitter. "Transmitting", as used herein, may be transmitting by a transmitter or, in the case of a circuit chip, transmitting the indication for output at the chip, to subsequently be sent to a transmitter for transmission. As another example, the determining an angular direction in step 684 may be performed by the processor comparing the first location to the second location, and expressing the difference between the two locations in directional terms, e.g. in terms of azimuth angle direction and/or zenith angle direction. As another example, the selecting a quantized angular direction in step 686 may be performed by the processor performing the mapping described above in relation to step 686. As another example, the indication of the quantized angular direction in step 688 may be transmitted by incorporating the indication in signaling, e.g. encoding the indication and including the encoded indication in signaling, which is then sent using a transmitter. As mentioned above, the transmitting may be transmitting by a transmitter or, in the case of a circuit chip, transmitting the indication for output at the chip, to subsequently be sent to a transmitter for transmission.

In some of the embodiments described herein, channel estimation is performed using a reference signal, e.g. a reference signal that was transmitted by a NT-TRP. In some embodiments, the channel estimation may be performed using minimum mean square error (MMSE) or another technique. The received reference signal may be expressed as the transmitted reference signal multiplied by the channel and with the noise added. The transmitted reference signal is known because the reference signal sequence is known, and therefore the recipient of the reference signal, e.g. the UE 110, can estimate the value of the channel using the received reference signal and the transmitted reference signal.

CONCLUSION

In some embodiments, a beam indication framework is introduced in the context of an integrated terrestrial/non-terrestrial network. In some embodiments, LOS based communication between UEs and NT-TRPs, and/or between two NT-TRPs, and/or between T-TRPs and NT-TRPs, may be possible. In some embodiments, accurate beam indication with low-overhead may be possible. In some embodiments, beam management may be simplified because the UE is explicitly instructed about where to steer its receive/transmit beam. The UE might not need to perform beam sweeping to find the indicated reference signal from the NT-TRP. In some embodiments, a NT-TRP may steer its receive/transmit beam based on the BAI associated with another NT-TRP. The NT-TRP might not need to perform beam sweeping to find the indicated reference signal from the other NT-TRP.

Because of the deployment of NT-TRPs, edge-less mobility may be provided. For example, a UE of interest may be instructed to communicate with a NT-TRP. The NT-TRP may follow the UE and may perform cell handover on the UE's behalf. The network may ensure that a UE can be transferred from one NT-TRP to another NT-TRP.

In some embodiments, sensing-aided beam management may be provided. A UE may sense its environment and send sensing measurements of the UE's 3D environment back to the network, possibly allowing the network to determine the optimal location to send NT-TRPs to serve UEs. UEs may also determine where to steer their transmit/receive beams based on the sensing measurements.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method comprising:
transmitting an indication of a range of angular directions for use by an apparatus to communicate with a device;
determining an angular direction between a first location associated with the apparatus and a second location associated with the device;
selecting, based on the angular direction between the first location associated with the apparatus and the second location associated with the device, a quantized angular direction, wherein the quantized angular direction belongs to the range of angular directions;
transmitting an indication of the quantized angular direction.

2. The method of claim 1, wherein the device is a network device or a user equipment.

3. The method of claim 1, wherein the device is a non-terrestrial transmit-and-receive point (NT-TRP), and wherein the method comprises instructing the NT-TRP to move to the second location.

4. The method of claim 1, wherein the indication of the quantized angular direction is specific to the apparatus and transmitted in an apparatus-specific downlink transmission.

5. The method of claim 3, further comprising transmitting, to the apparatus, an indication of a time-frequency resource at which a reference signal from the NT-TRP is located.

6. The method of claim 1, wherein the indication of the quantized angular direction specifies an azimuth angle direction and/or a zenith angle direction.

7. The method of claim 6, wherein a first plurality of bits is used to specify the azimuth angle direction, wherein a second plurality of bits is used to specify the zenith angle direction, wherein each different azimuth angle direction corresponds to a respective different bit pattern of the first plurality of bits, and wherein each different zenith angle direction corresponds to a respective different bit pattern of the second plurality of bits.

8. The method of claim 1, wherein the indication of the range of angular directions is transmitted on a semi-static basis, and wherein the indication of the quantized angular direction is transmitted on a dynamic basis.

9. A system comprising:
a memory to store processor-executable instructions;
a processor to execute the processor-executable instructions to cause the processor to:
transmit an indication of a range of angular directions for use by an apparatus to communicate with a device;
determine an angular direction between a first location associated with the apparatus and a second location associated with the device;
select, based on the angular direction between the first location associated with the apparatus and the second location associated with the device, a quantized angular direction, wherein the quantized angular direction belongs to the range of angular directions;
transmit an indication of the quantized angular direction.

10. The system of claim 9, wherein the device is a network device or a user equipment.

11. The system of claim 9, wherein the device is a non-terrestrial transmit-and-receive point (NT-TRP), and wherein upon execution of the processor-executable instructions, the processor is further to generate an instruction that instructs the NT-TRP to move to the second location.

12. The system of claim 9, wherein the indication of the quantized angular direction is specific to the apparatus and is transmitted in an apparatus-specific downlink transmission.

13. The system of claim 11, wherein upon execution of the processor-executable instructions, the processor is further to transmit an indication of a time-frequency resource at which a reference signal from the NT-TRP is located.

14. The system of claim 9, wherein the indication of the quantized angular direction specifies an azimuth angle direction and/or a zenith angle direction.

15. The system of claim 14, wherein a first plurality of bits is used to specify the azimuth angle direction, wherein a second plurality of bits is used to specify the zenith angle direction, wherein each different azimuth angle direction corresponds to a respective different bit pattern of the first plurality of bits, and wherein each different zenith angle direction corresponds to a respective different bit pattern of the second plurality of bits.

16. The system of claim 9, wherein the indication of the range of angular directions is transmitted on a semi-static basis, and wherein the indication of the quantized angular direction is transmitted on a dynamic basis.

17. A non-transitory computer readable storage medium storing instructions, when the instructions executed by a computer, cause a system to:
transmit an indication of a range of angular directions for use by an apparatus to communicate with a device;
determine an angular direction between a first location associated with the apparatus and a second location associated with the device;
select, based on the angular direction between the first location associated with the apparatus and the second location associated with the device, a quantized angular direction, wherein the quantized angular direction belongs to the range of angular directions;
transmit an indication of the quantized angular direction.

18. The non-transitory computer readable storage medium of claim 17, wherein the device is a network device or a user equipment.

19. The non-transitory computer readable storage medium of claim 17, wherein the device is a non-terrestrial transmit-and-receive point (NT-TRP), and wherein upon execution of the instructions, the computer is further to generate instructions that instruct the NT-TRP to move to the second location.

20. The system of claim 17, wherein the indication of the quantized angular direction is specific to the apparatus and is transmitted in an apparatus-specific downlink transmission.

* * * * *